(12) United States Patent
Gotou

(10) Patent No.: US 9,423,640 B2
(45) Date of Patent: Aug. 23, 2016

(54) DISPLAY DEVICE COMPRISING A FIRST POSITIONING PORTION OPPOSITE TO A SECOND POSITIONING PORTION AND TELEVISION DEVICE HAVING THE SAME

(71) Applicant: Sharp Kabushiki Kaisha, Osaka-shi, Osaka (JP)

(72) Inventor: Akira Gotou, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 15 days.

(21) Appl. No.: 14/404,660

(22) PCT Filed: Jul. 5, 2013

(86) PCT No.: PCT/JP2013/068487
§ 371 (c)(1),
(2) Date: Dec. 1, 2014

(87) PCT Pub. No.: WO2014/010527
PCT Pub. Date: Jan. 16, 2014

(65) Prior Publication Data
US 2015/0146112 A1    May 28, 2015

(30) Foreign Application Priority Data
Jul. 12, 2012  (JP) ................................ 2012-156531

(51) Int. Cl.
*G02F 1/1333* (2006.01)
*H04N 5/66* (2006.01)
(Continued)

(52) U.S. Cl.
CPC ........ *G02F 1/133308* (2013.01); *G02B 6/0068* (2013.01); *G02B 6/0088* (2013.01);
(Continued)

(58) Field of Classification Search
CPC .................. G02F 2001/13332; G02F 2201/50; G02F 2001/133311; G02F 2001/133322
See application file for complete search history.

(56) References Cited

U.S. PATENT DOCUMENTS

2007/0222917 A1* 9/2007 Ono ................... G02F 1/133308
349/65
2009/0002930 A1  1/2009 Nakanishi et al.

FOREIGN PATENT DOCUMENTS

JP          04-011583 U    1/1992
JP          2000-066178 A  3/2000
(Continued)

OTHER PUBLICATIONS

Official Communication issued in International Patent Application No. PCT/JP2013/068487, mailed on Sep. 24, 2013.

*Primary Examiner* — Paul Lee
(74) *Attorney, Agent, or Firm* — Keating & Bennett, LLP

(57) ABSTRACT

A liquid crystal display device 10 includes LEDs 17, a liquid crystal panel 11, a chassis 14, a frame 13, positioning ribs 23, opposed portions 25, and gel members 30. The liquid crystal panel 11 is configured to display using light from the LEDs 17. The chassis 14 is arranged on an opposite side of the liquid crystal panel 11 from a display surface 11c that is for display. The frame 13 is arranged on the display surface 11c side of the liquid crystal panel 11. The frame 13 holds at least the liquid crystal panel 11 and the LEDs 17 with the chassis 14 such that the liquid crystal panel 11 and the LEDs 17 are sandwiched between the frame 13 and the chassis 14. The positioning ribs 23 project from the frame 13 toward the chassis 14. The positioning ribs 23 include a peripheral surface opposite a peripheral surfaced of the liquid crystal panel 11 for positioning the liquid crystal panel 11. The opposed portions 25 are arranged at portions opposite the positioning ribs 23 of the liquid crystal panel 11. The gel members 30 have elastic properties and are arranged in gaps between the positioning ribs 23 and the respective opposed portions 25.

10 Claims, 20 Drawing Sheets

(51) Int. Cl.
  *H04N 5/64* (2006.01)
  *F21V 8/00* (2006.01)
  *H04N 5/645* (2006.01)
(52) U.S. Cl.
  CPC ............... *G02B6/0091* (2013.01); *H04N 5/66* (2013.01); *G02B 6/0055* (2013.01); *G02B 6/0085* (2013.01); *G02F 2001/13332* (2013.01); *G02F 2001/133314* (2013.01); *G02F 2201/50* (2013.01); *H04N 5/64* (2013.01); *H04N 5/645* (2013.01)

(56) References Cited

FOREIGN PATENT DOCUMENTS

| | | |
|---|---|---|
| JP | 2008-145808 A | 6/2008 |
| JP | 2008-203319 A | 9/2008 |
| JP | 2009-031754 A | 2/2009 |
| JP | 2009-145669 A | 7/2009 |

\* cited by examiner

DISPLAY DEVICE COMPRISING A FIRST POSITIONING PORTION OPPOSITE TO A SECOND POSITIONING PORTION AND TELEVISION DEVICE HAVING THE SAME

TECHNICAL FIELD

The present invention relates to a display device and a television device.

BACKGROUND ART

A liquid crystal display device such as a liquid crystal television device requires a backlight unit as a separately provided lighting device because a liquid crystal panel, which is a display panel, does not emit light itself. The backlight unit in such a liquid crystal display device is generally classified into either a direct type or an edge-light type according to a mechanism thereof. It is considered that an edge-light type backlight unit is more preferable for further reduction of the thickness of the liquid crystal display device.

The display panel such as an above-described liquid crystal panel is usually arranged in front of the backlight unit on a display side while edges thereof are held by a frame or a frame-like member. Such a frame-like member may thermally contract when a temperature drops after expansion due to heat produced by light sources. When the frame-like member thermally contracts, entire edges of the display panel inside the frame-like member may be subjected to stress. This may result in damages to the display panel. A display device designed in consideration of preventing or reducing damages of a display panel is disclosed in Patent Document 1.

RELATED ART DOCUMENT

Patent Document

Patent Document 1: Japanese Unexamined Patent Application Publication No. 2008-145808

Problem to be Solved by the Invention

In the display device disclosed in Patent Document 1, a frame may partially contact the display panel when the frame thermally contracts. In such a case, safe avoidance of force applied from the frame side to the display panel side on a portion of the display panel where the frame contacts may not be possible. When a portion of the edges of the display panel is subjected to stress, a portion of a display surface corresponding to such a portion may be recognized as a white spot.

DISCLOSURE OF THE PRESENT INVENTION

A technology disclosed herein was made in view of the above circumstances. An object of the technology described herein is to restrict or suppress appearance of white spots in some areas on a display surface.

Means for Solving the Problem

A technology disclosed herein relates to a display device including a light source, a display panel, a chassis, a frame, a first positioning portion, a second positioning portion, and an elastic member. The display panel is configured to provide a display using light from the light source. The chassis is arranged on an opposite side of the display panel from a display surface of the display panel. The frame is arranged on a display surface side of the display panel and holds at least the display panel and the light source between the frame and the chassis. The first positioning portion projects from the frame toward the chassis and includes a peripheral surface opposite a peripheral surface of the display panel to position the display panel. The second positioning portion is included in the display panel in a portion thereof opposite the first positioning portion. The elastic member is in a gap between the first positioning portion and the second positioning portion.

In a display device in which a positioning portion is arranged between a display panel and a frame, when a condition is changed from a high-temperature condition while a light source is turned on to a low-temperature condition while the light source is turned off, the frame may contract toward the display panel. As a result, the display panel and the frame may be in contact each other at the positioning portion. Furthermore, forces may be applied from the frame side to the display panel side via the positioning portion due to the contraction of the frame. According to the display device described earlier, even if the frame contracts toward the display panel, forces applied from the frame to the display panel are absorbed by the elastic member in the gap between the first positioning portion and the second positioning portion. Therefore, forces are not or less likely to be applied to the display panel. With this configuration, appearance of white spots in some areas on the display surface to which forces are applied due to application of forces toward the display panel does not occur or is less likely to occur.

The elastic member may be in contact with the first positioning portion and the second positioning portion.

With this configuration, the forces applied toward the display panel can be absorbed at the time when the frame contracts toward the display panel. Therefore, the application of forces to the display panel is effectively restricted or suppressed.

The elastic member may be in a gel state.

According to this configuration, because the elastic member is in the gel state, the elastic member has adherence properties. Therefore, the frame and the display panel are bonded together with the elastic member in the gap between the first positioning portion and the second positioning portion and in contact with the first positioning portion and the second positioning portion. With this configuration, even if vibrations occur in the production process, the position of the display panel relative to the frame does not or less likely to change.

The display device may further include a light guide plate arranged over an opposite surface of the display panel to the display surface, including a peripheral surface opposite the light source, configured to guide the light from the light source toward the display panel, and including a cutout that receives the first positioning portion in the peripheral surface. The first positioning portion may project from the frame toward the chassis so as to face the peripheral surface of the light guide plate. The first positioning portion may be fitted in the cutout.

With this configuration, in the display device including the light guide plate, the light guide plate is positioned with respect to the plate surface thereof when the first positioning portion is fitted in the cutout.

The elastic member may have a light blocking property. The gap between the first positioning portion and the cutout is filled with the elastic member.

According to this configuration, even if rays of light leak from a gap between the first positioning portion and the cutout, the rays of light are blocked by the elastic member.

With this configuration, the rays of light do not or are less likely to enter the display panel 111 through end surfaces thereof.

The first positioning portion may include a protrusion that protrudes toward the display panel. The second positioning portion may include a recess that opens toward the protrusion such that the protrusion is fitted therein. The elastic member may be in the gap between the protrusion and the recess.

With this configuration, the display panel and the frame are fixed together through fitting of the protrusion in the recess and thus the display panel is positioned with respect to the panel surface. Namely, the positioning of the display panel within the frame can be further effectively performed.

The protrusion and the recess may have rectangular shapes in a plan view. The elastic member may be at least in a gap between a distal end surface of the protrusion and a bottom surface of the recess.

According to this configuration, at least the elastic member is arranged in a direction in which the frame contracts. With this configuration, the application of force to the display panel is effectively restricted or suppressed.

The display device may include multiple pairs of the first positioning portion and the second positioning portion.

In this configuration, multiple pairs of the first positioning portion and the second positioning portion are arranged. The application of forces from the frame side toward the display panel side is restricted or suppressed with equal counter forces at the opposed sides. Therefore, the application of forces is effectively restricted or suppressed.

The multiple pairs of the first positioning portion and the second positioning portion may be arranged at opposed sides of the display panel and opposed sides of the frame.

With this configuration, the application of force from the frame side toward the display panel side is restricted or suppressed with equal counter forces at the opposed sides. Therefore, the application of forces is effectively restricted or suppressed.

The technologies described in this specification may be applied to a display device including a display panel configured to provide display using light from the above-described lighting device. A display device that includes a liquid crystal panel as such a display panel may be considered as new and advantageous. Furthermore, a television device including the above-described display device may be considered as new and advantageous.

Advantageous Effect of the Invention

According to the technology disclosed herein, in a display device, appearance of white spots in some areas on the display surface does not occur or is less likely to occur.

MODE FOR CARRYING OUT THE INVENTION

First Embodiment

A first embodiment will be described with reference to the drawings. A liquid crystal display device 10 according to this embodiment will be described. X-axis, Y-axis and Z-axis are indicated in some drawings. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

Figure 1:
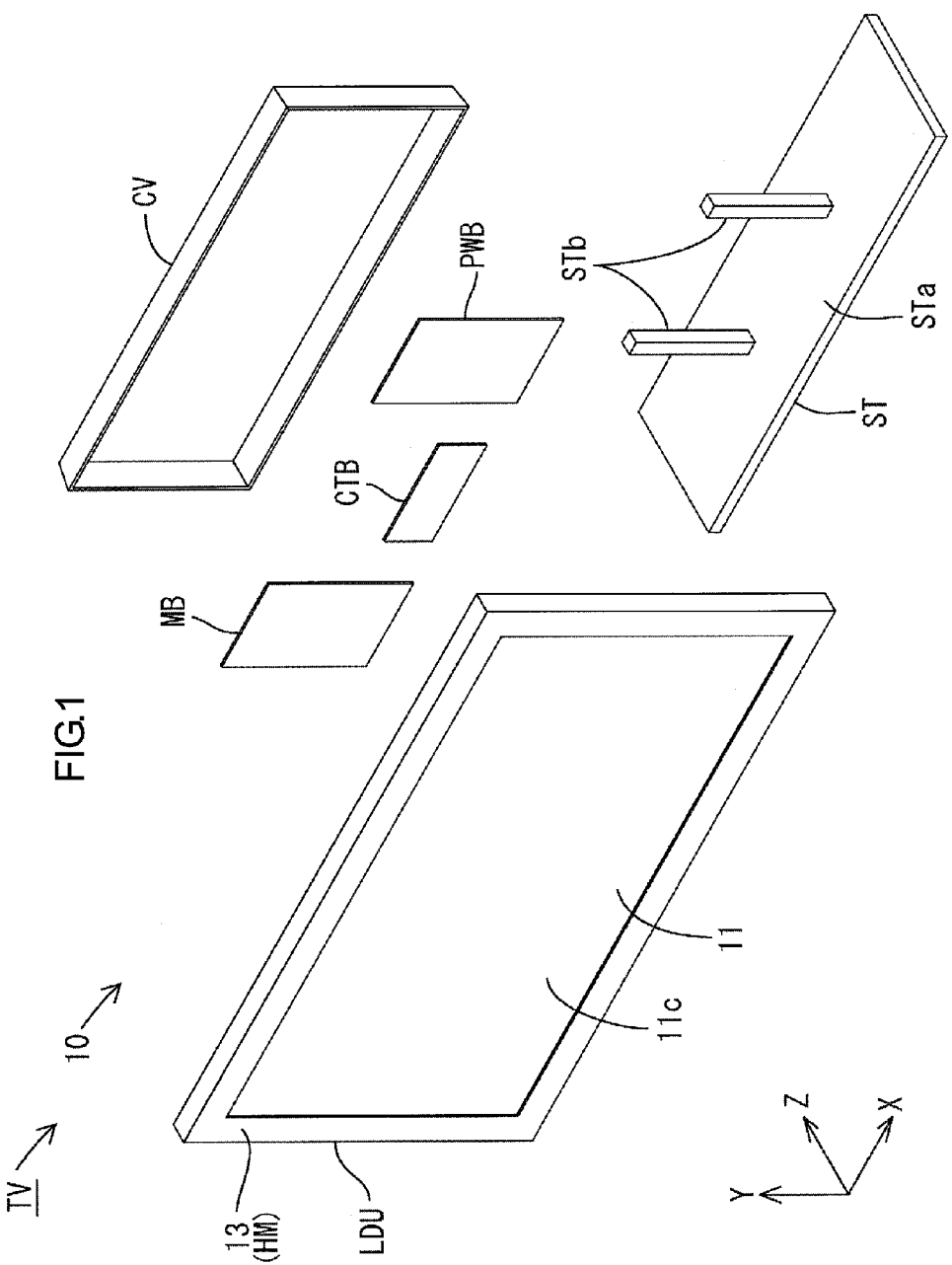
FIG. 1 is an exploded perspective view of a television device TV and a liquid crystal display unit LDU illustrating a schematic configuration thereof according to a first embodiment.
Figure 2:
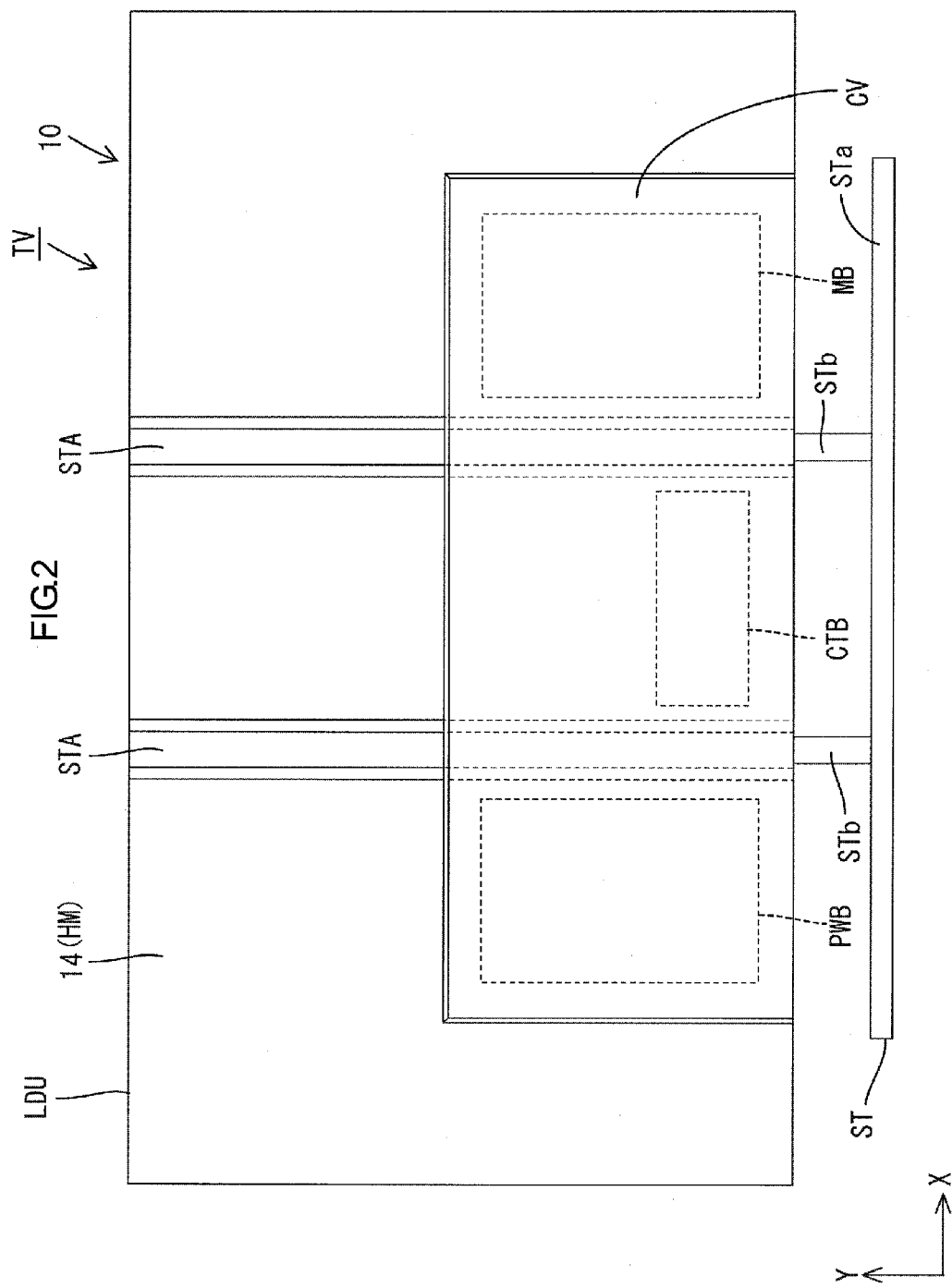
FIG. 2 is a rear view of the television device TV and the liquid crystal display device 10.

A television device TV includes a liquid crystal display unit LDU, boards PWB, MB, and CTB, a cover CV, and a stand ST. The boards PWB, MB, and CTB are attached to a rear surface (a back surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the vertical direction (the Y-axis direction). The liquid crystal display device 10 according to this embodiment has the same configuration as the above-described television device TV except for at least a component for receiving television signals (e.g. a tuner included in a main board MB). As illustrated in FIG. 2, the liquid crystal display unit LDU has a landscape rectangular overall shape (rectangular and longitudinal). The liquid crystal display unit LDU includes a liquid crystal panel 11 as a display panel and a backlight device 24 as a light source. The liquid crystal panel 11 and the backlight device 24 are collectively held by a frame 13 and a chassis 14. The frame 13 and the chassis 14 are external members that provide an external configuration of the liquid crystal display device 10. The chassis 14 in this embodiment is one of the components to form the exterior and a part of the backlight device 12.

A configuration of the liquid crystal display device 10 on a rear surface side will be described. As illustrated in FIG. 2, stand fitting members STA are attached to a rear surface of the chassis 14 that provides an external configuration of the back of the liquid crystal display device 10. The stand fitting members STA are spaced away from each other in an X-axis direction and extend along the Y-axis direction. Each stand fitting member STA has a cross section that corresponds to a cross section of a channel beam and opens to the chassis 14. A space is provided between the stand fitting member STA and the chassis 14. Support portions STb included in the stand ST are inserted in the respective stand fitting members STA. The space provided in the stand fitting member STA is configured to be a path through which wiring members (e.g. electric wires) connected to an LED board 18 are passed. The LED board 18 is included in the backlight device 12. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, the boards PWB, MB, and CTB are a power source board PWB, a main board MB, and a control board CTB. The power source board PWB will be referred to as a power supply of the liquid crystal display device 10, which is configured to supply drive power to the other boards MB and CTB and LEDs 17 included in the backlight device 12. Namely, the power source board PWB also serves as "an LED drive board that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

Figure 3:
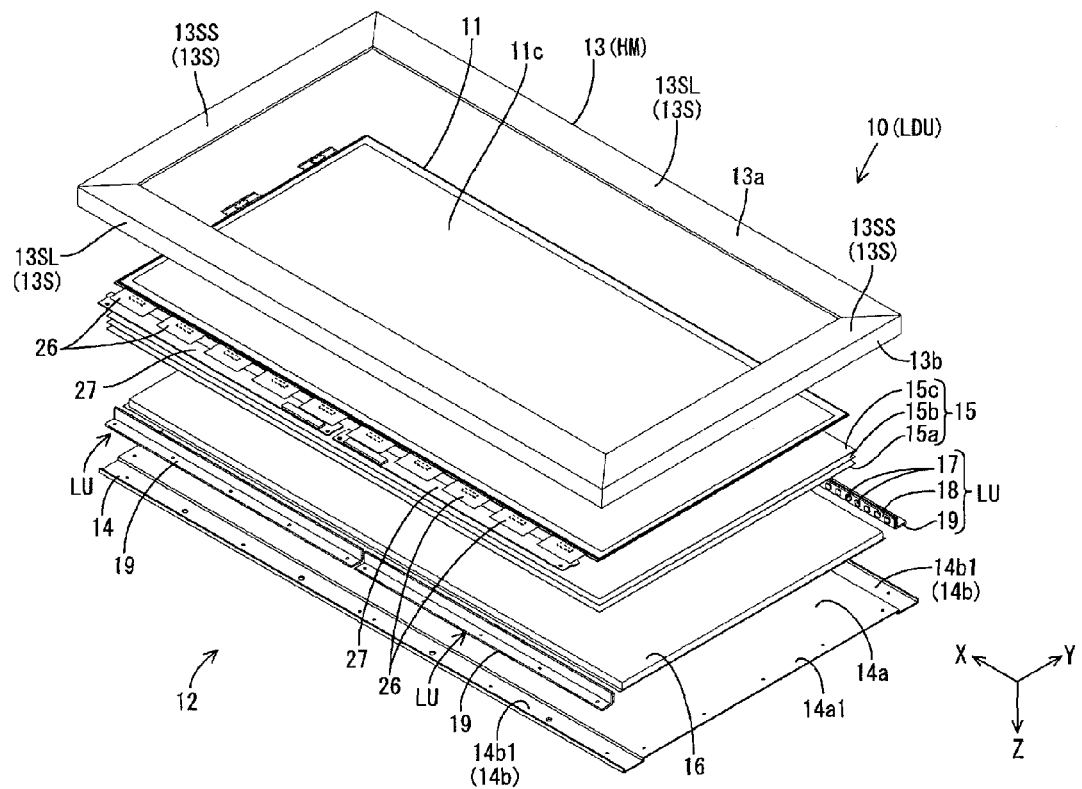
FIG. 3 is an exploded perspective view of the liquid crystal display device 10 illustrating a schematic configuration of the liquid crystal display unit LDU included therein.

As illustrated in FIG. 3, components of the liquid crystal display unit LDU included in the liquid crystal display device 10 are arranged in a space provided between the frame 13 that provides a front external configuration and the chassis 14 that provides a rear external configuration. The components arranged between the frame 13 and the chassis 14 at least include the liquid crystal panel 11, an optical member 15, a light guide plate 16, and LED units 20. The liquid crystal panel 11, the optical member 15, and the light guide plate 16 are placed on top of one another and held between the frame 13 on the front side and the chassis 14 on the rear side. The backlight device 12 includes the optical member 15, the light guide plate 16, the LED units LU, and the chassis 14. Namely, the liquid crystal display unit LDU without the liquid crystal panel 11 and the frame 13 corresponds to the backlight device 12. The LED units LU included in the backlight device 12 are arranged in the space between the frame 13 and the chassis 14. Two LED units LU are each arranged on each end of a short dimension of the light guide plate 16 (in the Y-axis direction). Each LED unit LU includes the LEDs 17 as light sources, the LED board 18, and a heat dissipation member (a heat spreader) 19. The LEDs 17 are mounted on the LED board 18. The LED board 18 is attached to the heat dissipation member 19. Each component will be described next.

As illustrated in FIG. 3, the liquid crystal panel has a landscape rectangular shape (rectangular and longitudinal) in a plan view and includes a pair of glass substrates 11a and 11b (see FIG. 4) and liquid crystals. The substrates 11a and 11b having high light transmissivity are bonded together with a predetermined gap therebetween. The liquid crystals are sealed between the substrates 11a and 11b. On one of the substrates (an array substrate 11b), switching elements (e.g. TFTs), pixel electrodes, and an alignment film are arranged. The switching elements are connected to gate lines and source lines that are arranged perpendicular to each other. The pixel electrodes are connected to the switching elements. On the other one of the substrates (a CF substrate 11a), color filters, a counter electrode, and an alignment film are arranged. The color filters include red (R), green (G), and blue (B) color portions that are arranged in a predetermined arrangement. The liquid crystal panel 11 is placed on a front side of the optical member 15, which will be described later. A rear-side surface of the liquid crystal panel 11 (an outer-side surface of a polarizing plate on the rear side) is fitted to the optical member 15 with minimal gaps therebetween. Therefore, dust is less likely to enter between the liquid crystal panel 11 and the optical member 15. The liquid crustal panel 11 includes a display surface 11c. The display surface 11c includes a display area and a non-display area. The display area is an inner area of a screen in which images are displayed. The non-display area is an outer area of the screen around the display area with a frame-like shape. The liquid crystal panel 11 is connected to the control board CTB via a driver for driving the liquid crystals and flexible boards 26. The liquid crustal panel 11 displays images in the display area of the display surface 11c based on signals sent from the control board CTB. The polarizing plates, which are not illustrated, are arranged on outer sides of the substrates 11a and 11b.

As illustrated in FIG. 3, similar to the liquid crystal panel 11, the optical member 15 has a landscape rectangular shape in a plan view and has the same size (i.e., a short-side dimension and a long-side dimension) as the liquid crystal panel 11. The optical member 15 is placed on the front side of the light guide plate 16 (a light exit side), which will be described later, and sandwiched between the light guide plate 16 and the liquid crystal panel 11. The optical member 15 includes three sheets that are placed on top of one another. Specifically, a diffuser sheet 15a, a lens sheet (a prism sheet) 15b, and a reflecting type polarizing sheet 15c are placed on top of one another in this sequence from the rear side (the light guide plate 16 side). The three sheets 15a, 15b, and 15c have the substantially same size in a plan view.

Figure 4:
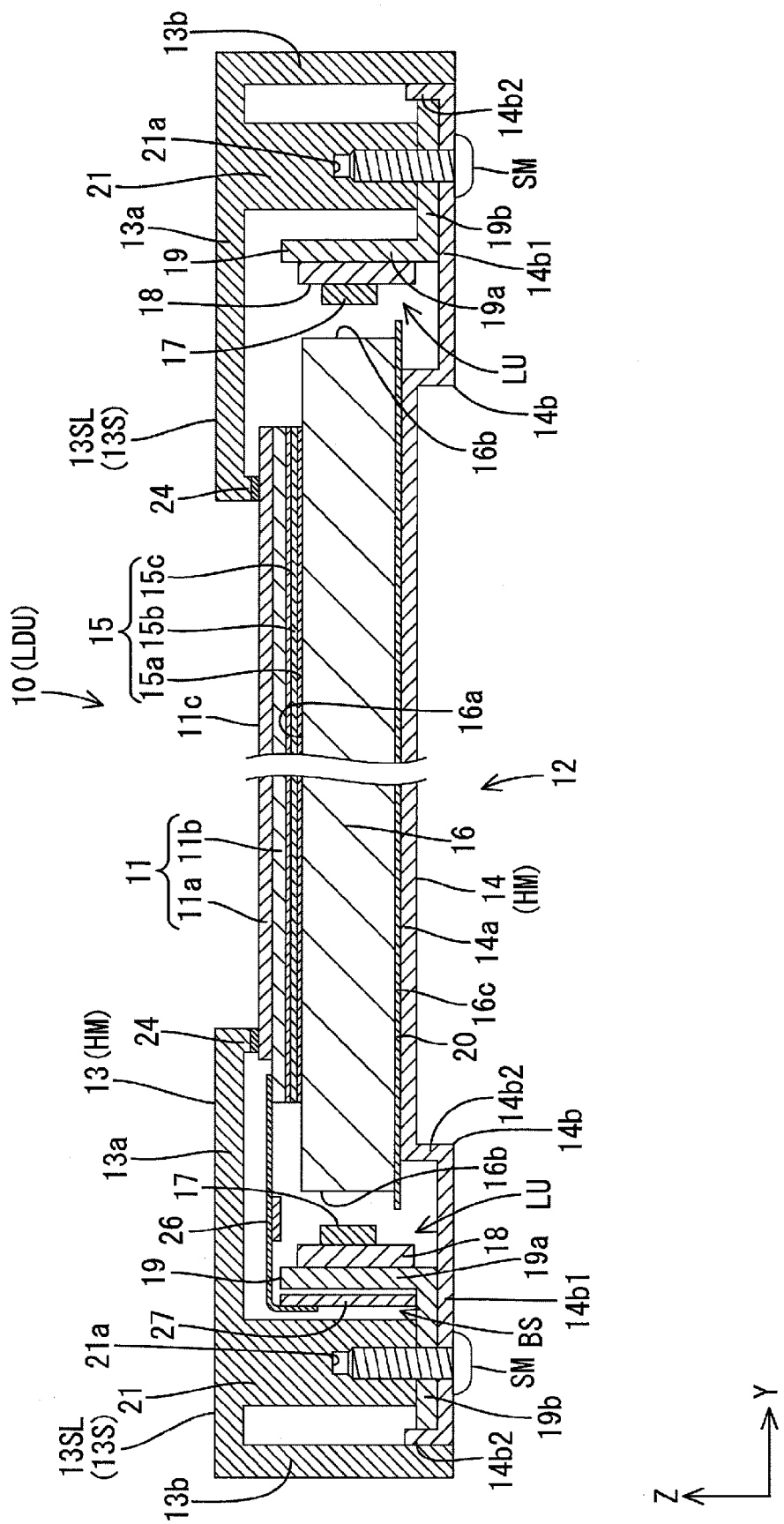
FIG. 4 is a cross-sectional view of the liquid crystal display device 10 along a short-side direction thereof illustrating a cross-sectional configuration.

The light guide plate 16 is made of substantially transparent (high transmissivity) synthetic resin (e.g. acrylic resin or polycarbonate such as PMMA) which has a refractive index sufficiently higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a main surface of the light guide plate 16 correspond to the X-axis direction and the Y-axis direction, respectively. A thickness direction of the light guide plate 16 that is perpendicular to the main surface of the light guide plate 16 corresponds to the Z-axis direction. The light guide plate 16 is arranged on the rear side of the optical member 15 and sandwiched between the optical member 15 and the chassis 14. As illustrated in FIG. 4, at least a short-side dimension of the light guide plate 16 is larger than those of the liquid crystal panel 11 and the optical member 15. The light guide plate 16 is arranged such that ends of the short dimension thereof (i.e., ends along a long-side direction of the light guide plate 16) protrude over ends of the liquid crystal panel 11 and the optical member 15 (so as not to overlap in a plan view). The LED units LU are arranged on sides of the short dimension of the light guide plate 16 so as to have the light guide plate 16 between the LED units LU in the Y-axis direction. Light from the LEDs 17 enters the light guide plate 16 through the ends of the short dimension of the light guide plate 16. The light guide plate 16 is configured to guide the light, which is from the LEDs 17 and enters the light guide plate 16 through the ends of the short dimension, toward the optical member 15 (on the front side).

One of the main surfaces of the light guide plate 16 facing the front side (a surface opposite the optical member 15) is a light exit surface 16a. Light exits the light guide plate 16 through the light exit surface 16a toward the optical member 15 and the liquid crystal panel 11. The light guide plate 16 includes outer peripheral end surfaces that are adjacent to the main surfaces of the light guide plate 16, and long-side end surfaces (end surfaces of the short dimension) which have elongated shapes along the X-axis direction are opposite the LEDs 17 (the LED boards 18). A predetermined space is provided between each long-side end and the LEDs 17 (the LED boards 18). The long-side end surfaces are light entrance surfaces 16b through each of which light from LEDs 17 enters. As illustrated in FIG. 4, a reflection sheet 20 is arranged on the rear side of the light guide plate 16, that is, on an opposed surface 16c that is opposite from the light exit surface 16a (a surface opposite the chassis 14). The reflection sheet 20 is arranged to cover an entire area of the opposed surface 16c.

The reflection sheet 20 is arranged so as to be sandwiched between the chassis 14 and the light guide plate 16. Light that exits the light guide plate 16 through the plate surface 16c toward the rear side is reflected by the reflection sheet 20 toward the front side. The reflection sheet 20 is made of synthetic resin and has a white surface having high light reflectivity. A short-side dimension of the reflection sheet 20 is larger than that of the light guide plate 16. The reflection sheet 20 is arranged such that ends of the short dimension thereof protrude closer to the LEDs 17 compared to the light entrance surfaces 16b of the light guide plate 16. Light that travels at an angle from the LEDs 17 toward the chassis 14 is effectively reflected toward the light entrance surfaces 16b of the light guide plate 16 by the protruded portions of the reflection sheet 20.

Next, a configuration of each of the LEDs 17, the LED board 18, and the heat dissipation member 19 included in the LED unit LU will be described. Each LED 17, which is included in the LED unit LU, includes an LED chip (not illustrated). The LED chip is arranged on a board that is fixed on a surface of the LED board 18 facing the light guide plate 16 and sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting surface that is opposite the light entrance surfaces 16b of the light guide plate 16 (an opposed surface opposite the light entrance surfaces 16b). Namely, the LED 17 is a so-called top-surface-emitting type LED.

As illustrated in FIG. 3, each LED board 18 included in the LED unit LU has an elongated plate-like shape and extends in the long-side direction of the light guide plate 16 (the X-axis direction, the long-side direction of the light entrance surface 16b). The LED boards 18 are arranged in a space between the frame 13 and the chassis 14 such that a plate surface of each LED board 18 is parallel to the X-Z plane, that is, parallel to the light entrance surface 16b of the light guide plate 16. Each LED board 18 has a long-side dimension that is about a half of the long-side dimension of the light guide plate 16. The LED board 18 includes a mount surface on which the LEDs 17 are surface-mounted. The mount surface 18a is a plate surface that faces inward, namely, a plate surface that faces the light guide plate 16 (the surface opposite the light guide plate 16). The LEDs 17 are arranged in a line (i.e., linearly) at intervals on the mount surface 18a of the LED board 18 along the long-side direction of the LED board 18 (the X-axis direction). In other words, multiple LEDs 17 are arranged apart from each other along long-side ends of the backlight device 12. Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). A metal-film trace (not illustrated), such as a copper-foil trace, is formed on the mount surface 18a of the LED board 18. The metal-film trace extends in the X-axis direction and crosses over a group of the LEDs 17 so as to connect the adjacent LEDs 17 in series. Terminals at ends of the trace are electrically connected to the power source board PWB via wiring members including connecters and electric wires. Thus, driving power is supplied to the LEDs 17.

The heat dissipation member 19 included in each LED unit LU is made of metal having high thermal conductivity, such as aluminum. As illustrated in FIGS. 3 and 4, the heat dissipation member 19 includes an LED mounting portion 19a and a heat dissipating portion 19b. The LED board 18 is attached to the LED mounting portion 19a. The heat dissipating portion 19b is in surface-contact with a plate surface of the chassis 14. The LED mounting portion 19a and the heat dissipating portion 19b form an angle therebetween so as to have an L-like shape in a cross-section. The heat dissipation member 19 has a long dimension substantially equal to the long dimension of the LED board 18. The LED mounting portion 19a of the heat dissipation member 19 has a plate-like shape parallel to the plate surface of the LED board 18 and the light entrance surface 16b of the light guide plate 16. A long-side direction, a short-side direction, and a thickness direction of the LED mounting portion 19a are aligned with the X-axis direction, the Z-axis direction, and the Y-axis direction, respectively. The LED board 18 is mounted on an inner surface of the LED mounting portion 19a, which is a plate surface that faces the light guide plate 16. While the LED mounting portion 19a has a long dimension that is substantially equal to the long dimension of the LED board 18, a short dimension of the LED mounting portion 19a is larger than a short dimension of the LED board 18. Therefore, ends of the LED mounting portion 19a with respect to the short dimension protrude over the LED board 18 in the Z-axis direction. An outer plate surface of the LED mounting portion 19a is a plate surface opposite from the plate surface on which the LED board 18 is attached. The outer plate surface faces a screw mounting portion 21 of the frame 13. The LED mounting portion 19a is located between the screw mounting portion 21 of the frame 13 and the light guide plate 16. The LED mounting portion 19a projects from an inner end of the heat dissipating portion 19b, which is an end of the heat dissipating portion 19b closer to the LEDs 17 (the light guide plate 16), in the Z-axis direction (a direction in which the liquid crystal panel 11, optical member 15, and the light guide plate 16 overlap each other) toward the front side, that is, toward the frame 13.

As illustrated in FIGS. 3 and 4, the heat dissipating portion 19b has a plate-like shape and is parallel to the plate surface of the chassis 14. A long-side direction, a short-side direction, and a thickness direction of the heat dissipating portion 19b are aligned with the X-axis direction, the Y-axis direction, and the Z-axis direction, respectively. The heat dissipating portion 19b extends from a rear-side end of the LED mounting portion 19a in the Y-axis direction toward the outer side. In other words, the heat dissipating portion 19b extends from an end of the LED mounting portion 19a closer to the chassis 14 in an opposite direction to the light guide plate 16. The heat dissipating portion 19b has a long dimension substantially equal to the long-side dimension of the LED mounting portion 19a. An entire rear plate surface of the heat dissipating portion 19b, which is a plate surface of the heat dissipating portion 19b facing the chassis 14, is in surface-contact with the plate surface of the chassis 14. A front plate surface of the heat dissipating portion 19b is a plate surface opposite from the surface in contact with the chassis 14. The front plate surface faces the screw mounting portion 21 of the frame 13. Specifically, the front plate surface of the heat dissipating portion 19b is in contact with a projected end surface of the screw mounting portion 21. The heat dissipating portion 19b is sandwiched (or disposed) between the screw mounting portion 21 of the frame 13 and the chassis 14. With this configuration, heat generated from the LEDs 17 as they are turned on is transferred to the chassis 14 and the frame 13 including the screw mounting portion 21 via the LED board 18, the LED mounting portion 19a, and the heat dissipating portion 19b. Therefore, heat is effectively released to the outside of the liquid crystal display device 10 and thus the heat is less likely to stay therein. The heat dissipating portion 19b includes through holes. The screw members SM are passed through the respective through holes. The heat dissipating portion 19b is fixed to the screw mounting portion 21 with the screw members SM.

Next, configurations of the frame 13 and the chassis 14 that form the exteriors and a holding member HM will be described. The frame 13 and the chassis 14 are made of metal such as aluminum. Therefore, the mechanical strength (rigidity) and thermal conductivity of the frame 13 and the chassis 14 are higher than those of a frame and a chassis made of synthetic resin. As illustrated in FIG. 3, the frame 13 and the chassis 14 hold the LED units LU at ends of the short dimension of the frame 13 and the chassis 14 (at the respective long sides). The frame 13 and the chassis 14 hold the liquid crystal panel 11, the optical member 15, and the light guide plate 16, which are placed on top of one another from the front side and the rear side.

As illustrated in FIG. 3, the frame 13 has a landscape rectangular shape so as to surround the display area in the display surface 11c of the liquid crystal panel 11. The frame 13 includes a panel holding portion 13a and a peripheral wall 13b. The panel holding portion 13a is parallel to the display surface 11c of the liquid crystal panel 11 and presses the liquid crystal panel 11 from the front side. The peripheral wall 13b protrudes from an outer peripheral edges of the panel holding portion 13a toward the rear side. The panel holding portion 13a and the peripheral wall 13b form an L-like shape in a cross section. The panel holding portion 13a forms a landscape-rectangular frame-like shape that corresponds to an outer peripheral portion of the liquid crystal panel 11 (i.e., the non-display area, a frame-like portion). The panel holding portion 13a presses a substantially entire area of the outer peripheral portion of the liquid crystal panel 11 from the front side. The panel holding portion 13a has a width that is large enough to cover not only the outer peripheral portion of the liquid crystal panel 11 but also an outer peripheral portion of the optical member 15, an outer peripheral portion of the light guide plate 16, and LED units LU from the front side. The outer peripheral portions of the optical member 15 and the light guide plate 16 and the LED units LU are located outer than the outer peripheral portion of the liquid crystal panel 11 in a radiation direction. Similar to the display surface 11c of the liquid crystal panel 11, a front exterior surface of the panel holding portion 13a (an opposed surface from the surface facing the liquid crystal panel 11) is viewed from the front side of the liquid crystal display device 10. The panel holding portion 13a forms a front exterior of the liquid crystal display device 10 together with the display surface 11c of the liquid crystal panel 11. The peripheral wall 13b has a substantially rectangular hollow shape and protrudes from the outer peripheral portion (specifically, an outer peripheral end portion) of the panel holding portion 13a toward the rear side. The peripheral wall 13b entirely surrounds the liquid crystal panel 11, the optical member 15, the light guide plate 16, and the LED units LU, which are arranged in the space between the frame 13 and the chassis 14. The peripheral wall 13b surrounds an entire periphery of the rear chassis 14 on the rear side. An outer surface of the peripheral wall 13b that extends along an outer peripheral surface of the liquid crystal display device 10 can be viewed from the outside of the liquid crystal display device 10. Therefore, the outer surface of the peripheral wall 13b constitutes a top surface, a bottom surface, and peripheral surfaces of the liquid crystal display device 10.

The frame 13 having the above-described basic configuration is assembled from four divided frame members 13S corresponding to four sides (long sides and short sides). Specifically, the divided frame members 13S include a pair of long-side frame members 13SL and a pair of short-side frame members 13SS. The long-side frame members 13SL correspond to the long sides of the frame 13 (including panel holddown portions 13a and peripheral wall portions 13b).

The short-side frame members 13SS correspond to the short sides of the frame 13. Positioning ribs 23, which will be described later, are included in the respective short-side frame members 13SS. Each long-side frame member 13SL covers the LED units LU in addition to the liquid crystal panel 11, the optical member 15, and the light guide plate 16 (see FIG. 4). Therefore, the long-side frame member 13SL has a width larger than that of each short-side frame member 13SS that is not cover the LED units LU (see FIG. 5 or 6).

Figure 5:
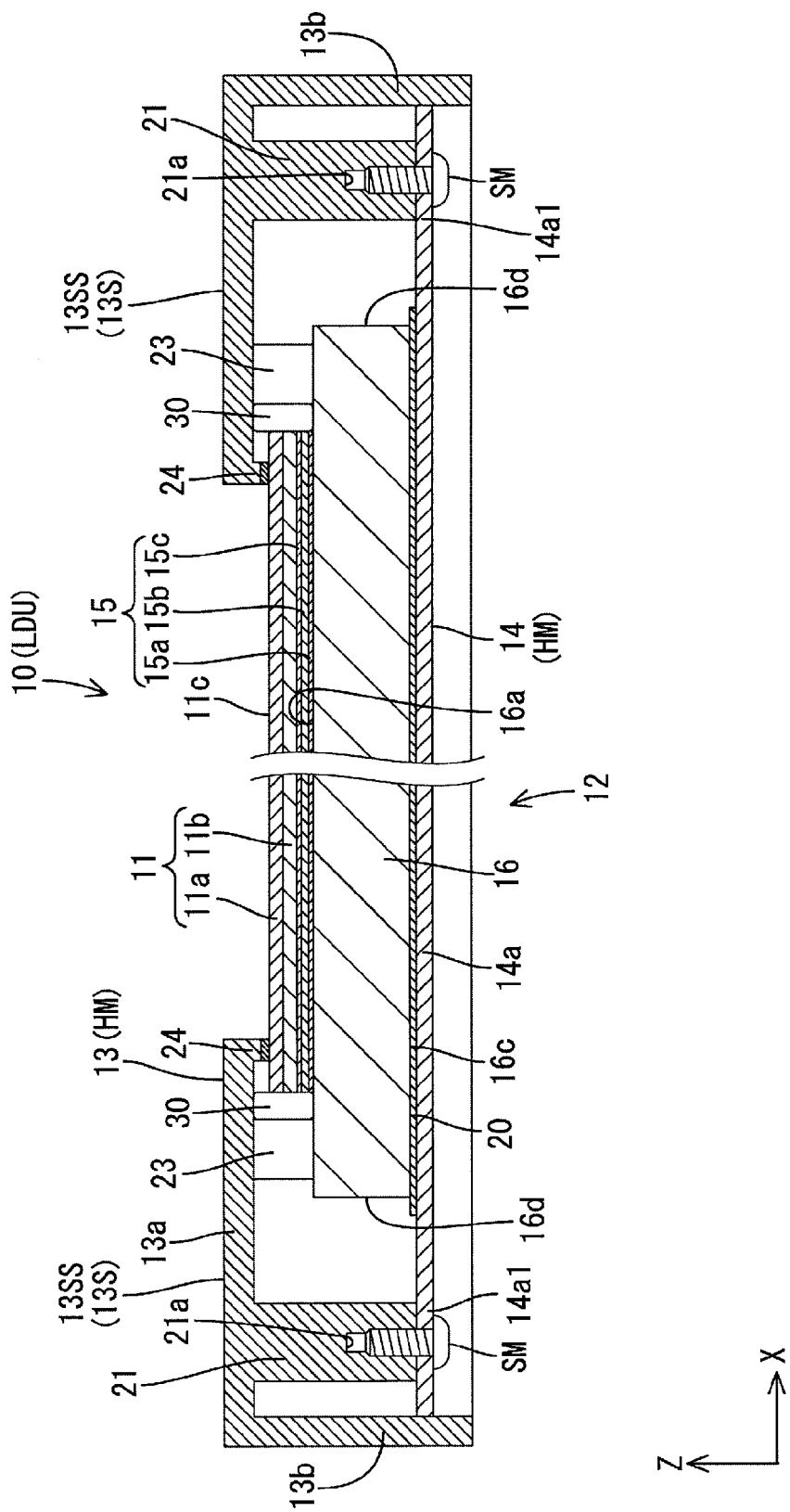
FIG. 5 is a cross-sectional view of the liquid crystal display device 10 along a long-side direction thereof illustrating a cross-sectional configuration.
Figure 6:
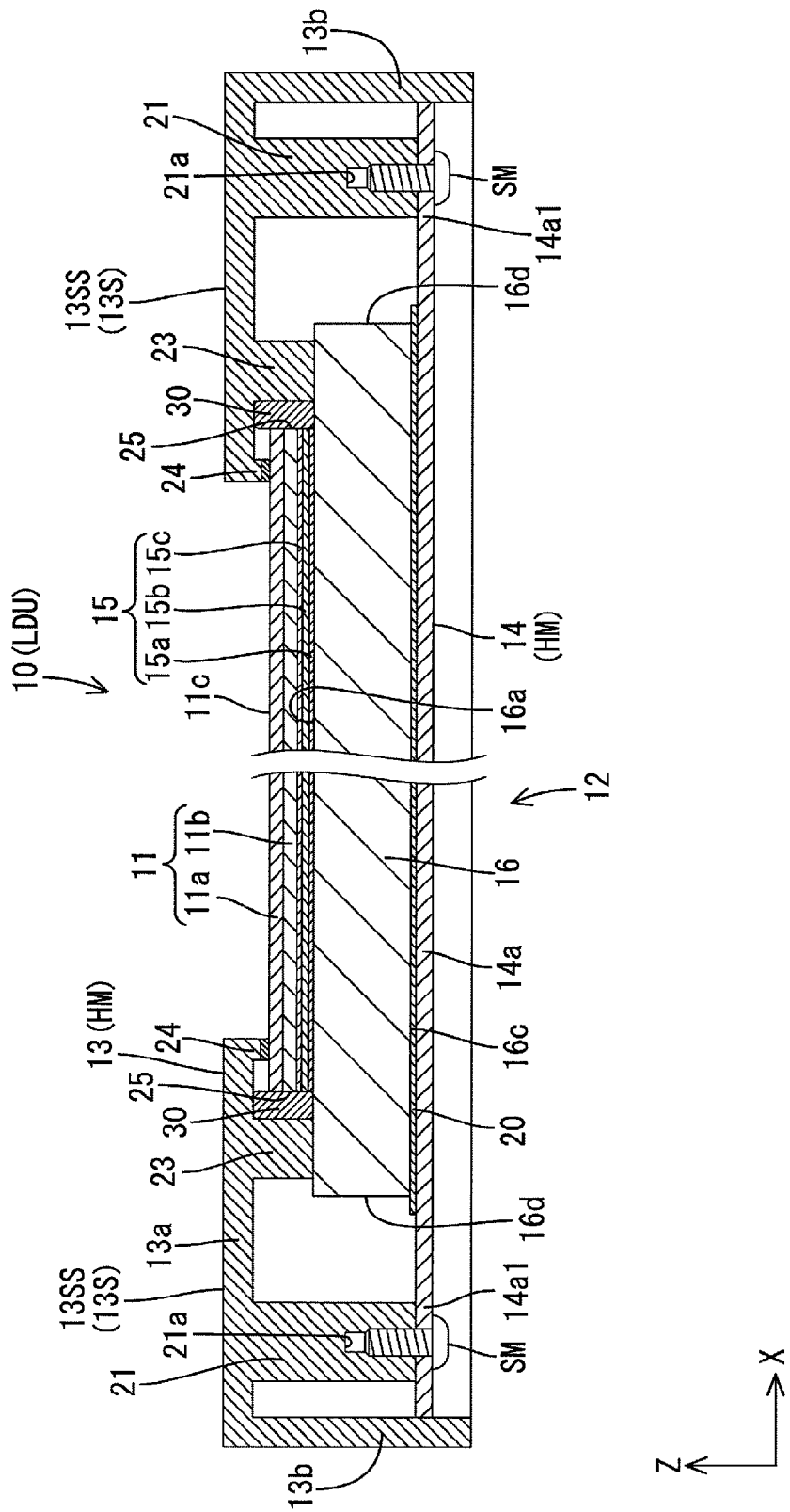
FIG. 6 is a cross-sectional view of the liquid crystal display device 10 with a section including a positioning rib 23 illustrating a cross-sectional configuration.

As illustrated in FIGS. 4 through 6, the panel holding portion 13a includes screw mounting portions 21. Each of the screw mounting portions 21 is located closer to an interior side than the peripheral wall 13b of the panel holding portion 13a (a position close to the light guide plate 16). Screw members SM (an example of an attachment member) are attached to the screw mounting portions 21. The screw mounting portion 21 protrudes from an inner surface of the panel holding portion 13a in the Z-axis direction toward the rear side and has an elongated block-like shape that extends along each side of the panel holding portion 13a (in the X-axis direction or the Y-axis direction). As illustrated in FIG. 4, the screw mounting portion 21 includes a groove 21a that opens to the rear side and to which the screw member SM is fastened. As illustrated in FIG. 4, a predetermined gap is provided between each screw mounting portion 21 on a long side and a corresponding LED mounting portion 19a. One of the heat dissipation members 19 overlaps the flexible boards 26 in a plan view. A space is provided between the heat dissipation member 19 and the screw mounting portion 21 to which the heat dissipation member 19 is attached. Printed circuit boards 27 are arranged in the space. The flexible circuit boards 26 are arranged on the printed circuit board 27 at intervals along a long-side direction of the printed circuit board 27. The flexible boards 26 are connected to the printed circuit board 27 at the other end thereof. The printed circuit board 27 includes a connector (not illustrated) to which an end of an FPC (not illustrated) is connected. The other end of the FPC extends to the rear side of the chassis 14 through an FPC hole (not illustrated) in the chassis 14 and is connected to the control board CTB.

As illustrated in FIG. 3, the chassis 14 has a substantially longitudinal shallow tray shape as a whole and covers entire areas of the light guide plate 16 and the LED unit LU from the rear side. A rear outer surface of the chassis 14 (a surface of the chassis 14 opposite from a surface that faces the LED unit LU) is viewed from the rear side and forms a back surface of the liquid crystal display device 10. The chassis 14 includes a bottom-plate portion 14a and a pair of LED holding portions 14b. The bottom-plate portion 14a has a landscape rectangular shape similar to the light guide plate 16. Each of the LED holding portions 14b protrudes from a long-side edge of the bottom-plate portion 14a toward the rear side to form a step. The LED units LU are arranged in the respective LED holding portions 14b.

As illustrated in FIGS. 3 and 4, the bottom-plate portion 14a has a flat plate shape so as to receive a large portion of the light guide plate 16 in its middle portion with respect to the short-side direction from the rear side (except the end portions with respect to the short-side direction). The bottom-plate portion 14a is configured as a light guide plate receiving portion. As illustrated in FIGS. 5 and 6, ends of the long dimension of the bottom-plate portion 14a extend over the ends of the long dimension of the light guide plate 16. The ends of the bottom-plate portion 14a are screw mounting portions 14a1 to which the screw members SM are mounted from the outside such that the frame 13 and the chassis 14 are fixed with the screw members SM.

As illustrated in FIGS. 3 and 4, the LED holding portions 14b are arranged so as to sandwich the bottom-plate portion 14a from ends of the short dimension of the bottom-plate portion 14a. Each LED holding portion 14b is recessed from the bottom plate portion 14a toward the rear side to provide a space in which the LED unit LU is arranged. The LED holding portion 14b includes a screw mounting portion 14b1 and a pair of side-plate portions 14b2. The screw mounting portion 14b1 is parallel to the bottom-plate portion 14a and the screw members SM are attached thereto from the outside. The side-plate portions 14b2 project from ends of the screw mounting portion 14b1 toward the front side. One of the side-plate portions 14b2 on the inner side continues to the bottom-plate portion 14a. An inner surface of the screw mounting portion 14b1 of the LED holding portion 14b is in surface-contact with a bottom-plate portion 19b of the heat dissipation member 19 of the LED unit LU. The other one of the side-plate portions 14b2 of the LED holding portion 14b on the outer side is fitted in a space provided between the long-side screw mounting portion 21 and the peripheral wall 13b. The side-plate portion 14b2 on the outer side has a positioning function with which the chassis 14 is properly positioned with respect to the frame 13 in the Y-axis direction.

Figure 8:
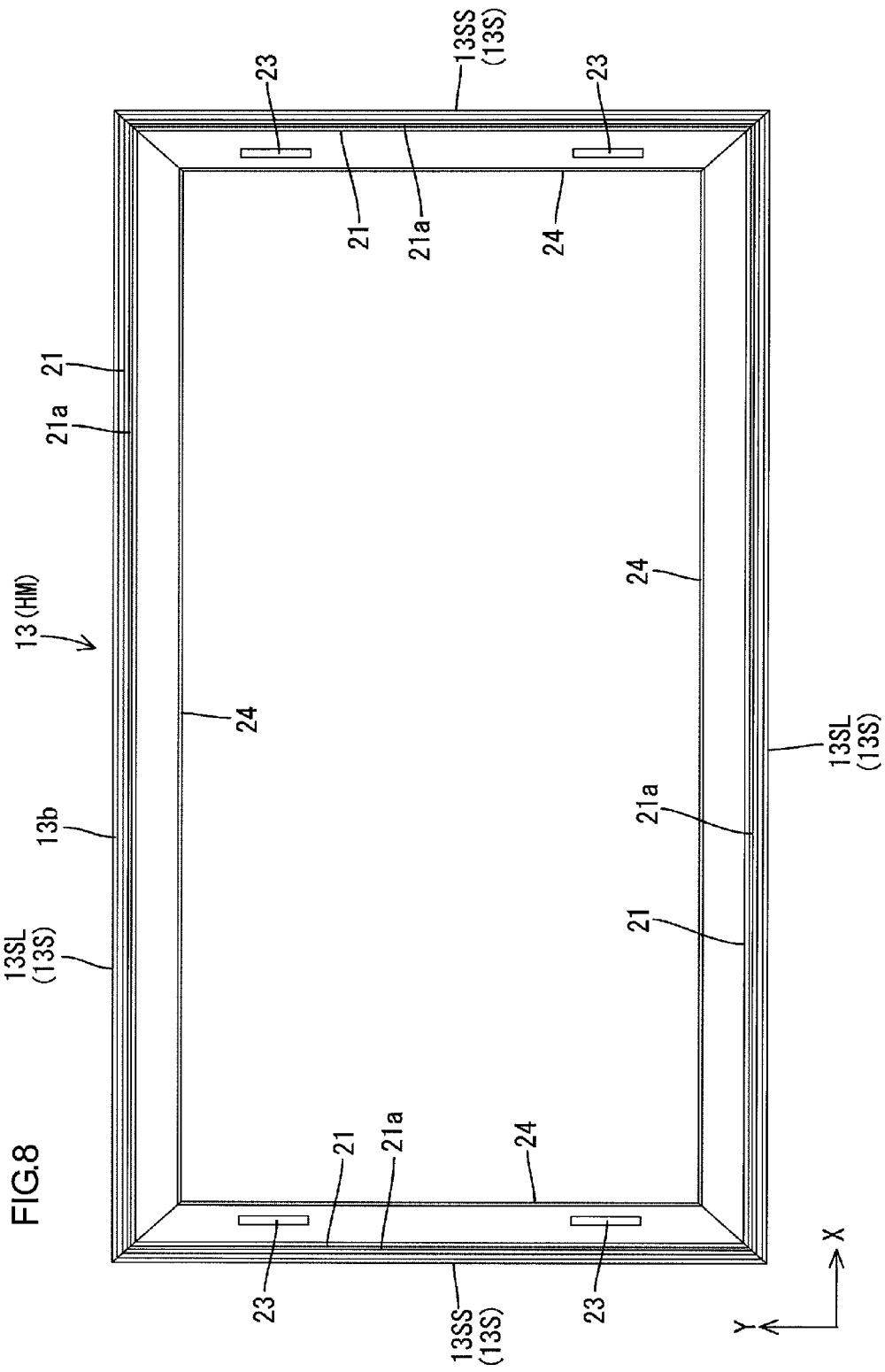
FIG. 8 is a plan view of a frame 13 viewed from the rear.

Next, configurations of positioning ribs 23 included in the frame 13, configurations and arrangements of gel members 30, and conditions of the frame 13 in a thermally contracting state will be described. The positioning ribs 23 are major features of this embodiment. As illustrated in FIG. 8, four positioning ribs (an example of a first positioning portion) 23 are integrally formed with portions of the panel holddown portions 13a of the respective short-side frame members 13SS of the frame 13 located inner than the screw mounting portions 21. The positioning ribs 23 support the light guide plate 16 from the front (the display surface 11c side). The positioning ribs 23 are used for positioning the liquid crystal panel 11 during the production of the liquid crystal display device 10. Each positioning rib 23 projects from an inner surface of the corresponding panel holddown portion 13a in the Z-axis direction (a direction in which the screw mounting portion 21 projects) toward the rear (toward the chassis 14). The positioning rib 23 has an elongated block-like shape (a square block-like shape) which extends along the corresponding side of the panel holddown portion 13a. The positioning rib 23 has an inner surface parallel to a peripheral surface of the short side of the liquid crystal panel 11 and a peripheral surface of the short side of the optical member 15 (portions of the peripheral surfaces of the liquid crystal panel 11 and the optical member 15 opposite the corresponding positioning rib 23 are referred to as an opposed portion (an example of a second positioning portion) 25). Each positioning rib 23 has a height equal to a sum of thicknesses of the liquid crystal panel 11 and the optical member 15. Therefore, a distal end surface of the positioning rib 23 is in contact with the light exit surface 16a of the light guide plate 16 while the light guide plate 16 is sandwiched between the distal end surface and the chassis 14. The light guide plate 16 is supported by the distal end surfaces of the positioning ribs 23 from the front (from the display surface 11c side), that is, the positioning ribs 23 have functions for supporting the light guide plate 16. Portions of the light guide plate 16 closer to edges thereof are held down from the front by the positioning ribs 23.

Figure 7:
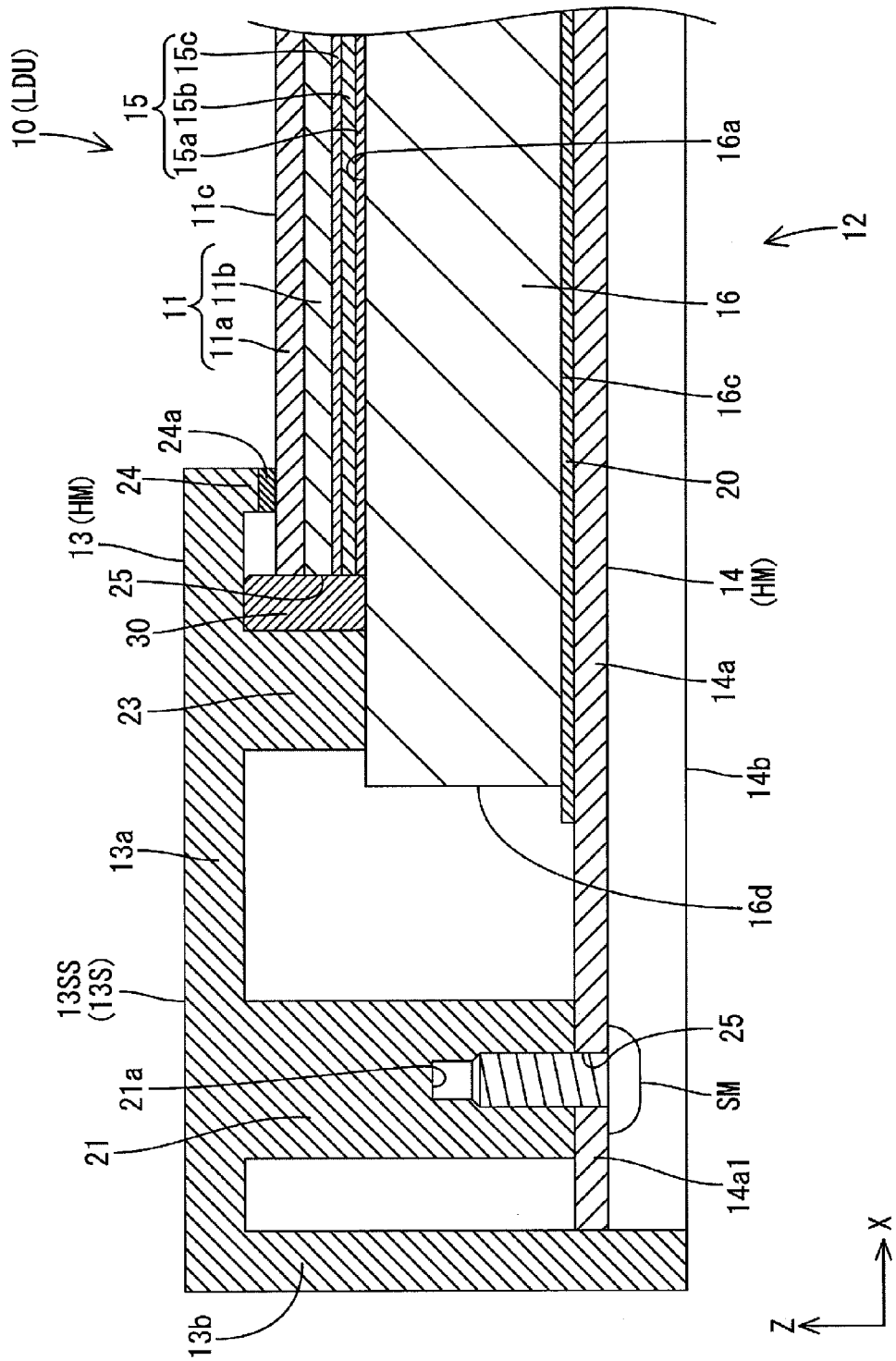
FIG. 7 is a cross-sectional view of a relevant portion of the liquid crystal display device 10 in FIG. 6 including a gel member 30 and therearound.
Figure 9:
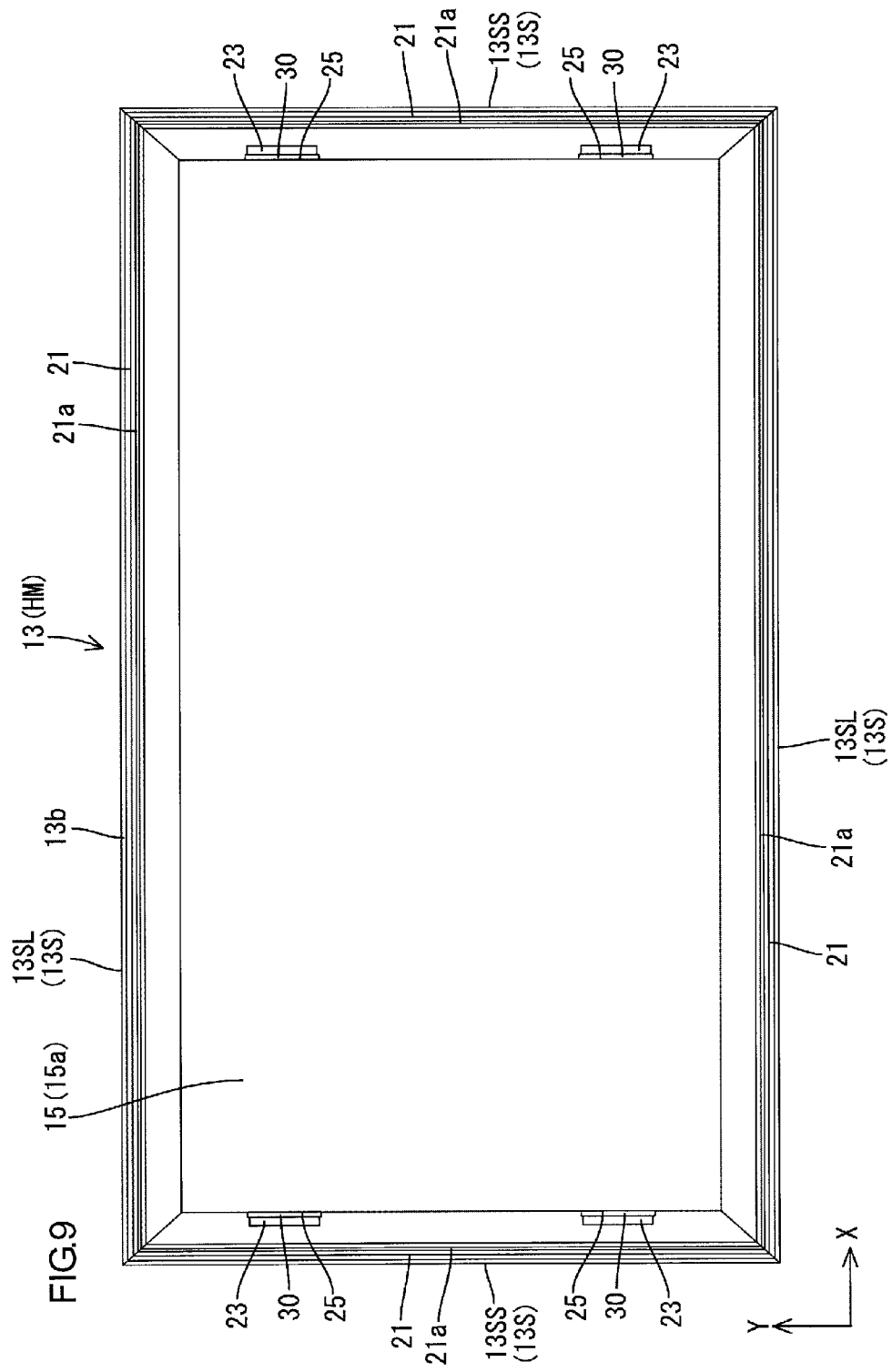
FIG. 9 is a plan view of the frame 13 with a liquid crystal panel 11 and an optical member 15 placed thereon viewed from the rear.
Figure 10:
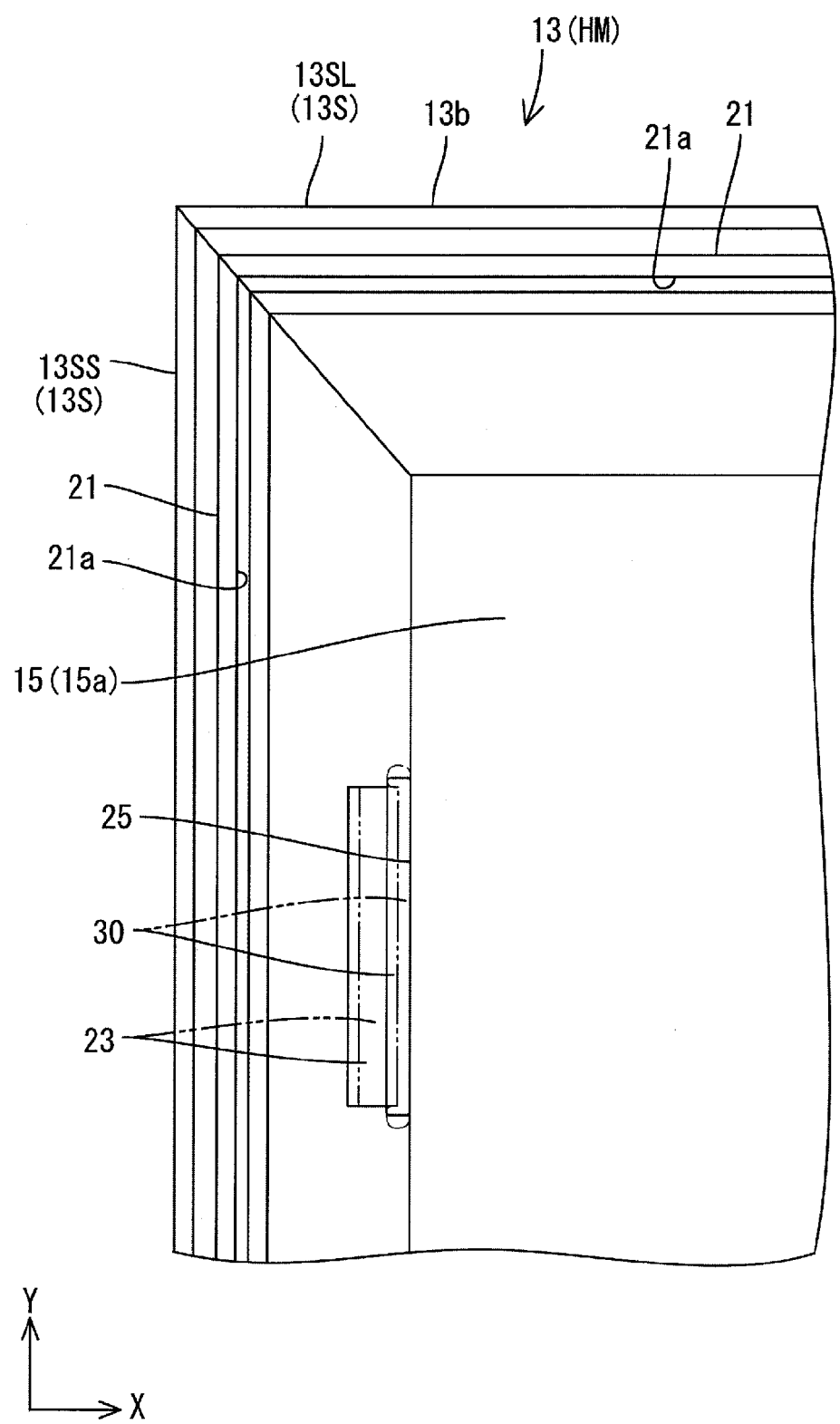
FIG. 10 is a magnified plan view of a portion in FIG. 9 including the gel member 30 and therearound.
Figure 11:
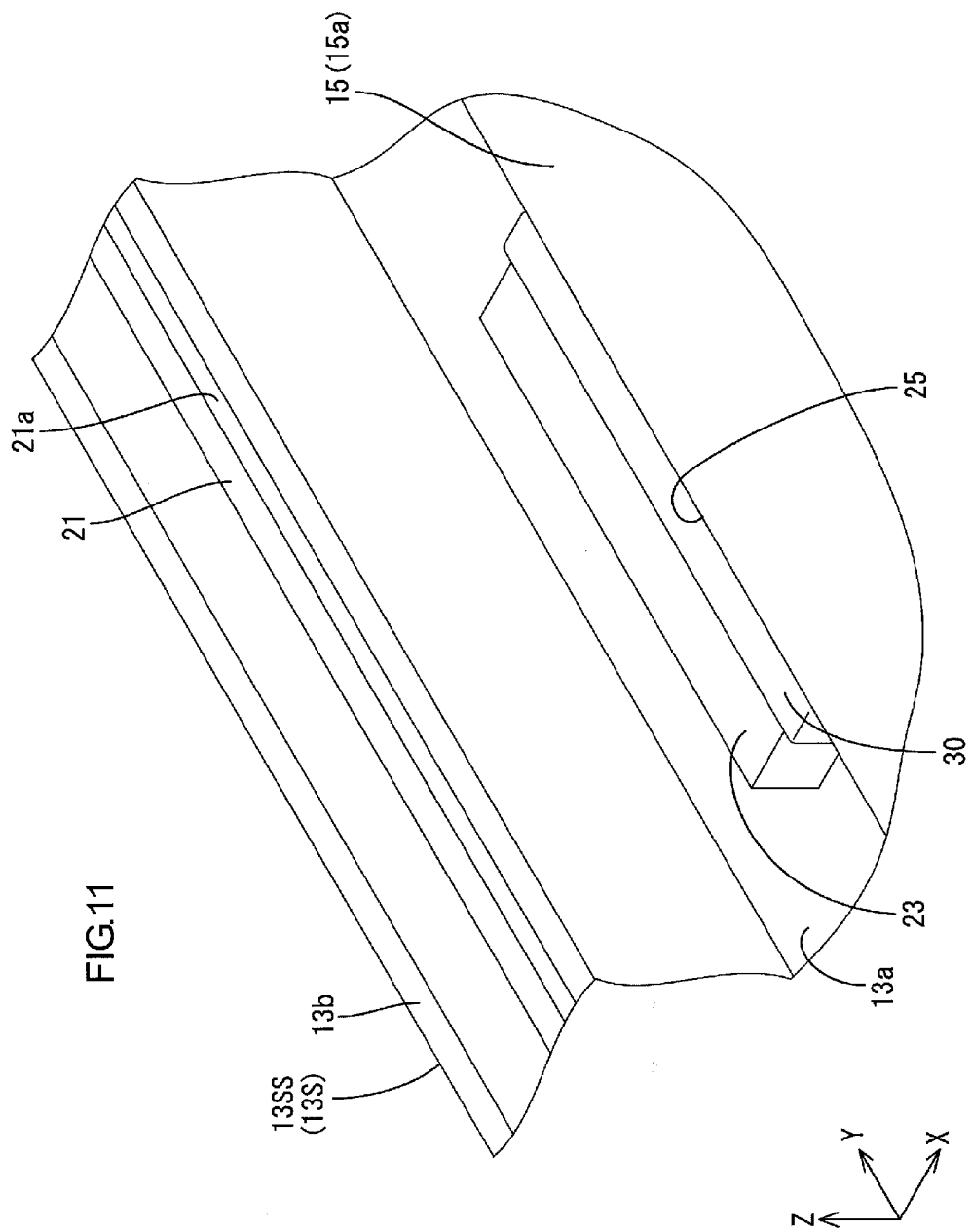
FIG. 11 is a perspective view illustrating the gel member 30 and therearound in FIG. 10 viewed from an angle.

As illustrated in FIGS. 9 to 11, the gel members 30 are disposed between the inner surfaces of the positioning ribs 23 and the respective opposed portions 25. Each gel member 30 has elastic properties. The gel member 30 is made of styrene or the like material. The gel member 30 is disposed to fill a gap between the inner surface of the corresponding positioning rib 23 and the corresponding opposed portion 25. The gel member 30 slightly sticks out of the ends of ends of the positioning rib 23. As illustrated in FIG. 7, the rear side of the gel member 30 is in contact with the light exit surface 16a of the light guide plate 16 and the front side of the gel member 30 is in contact with the panel holddown portion 13a of the frame 13. With the gel member 30, even if a force is applied from the positioning rib 23 side to the opposed portion 25 side, the force is absorbed by the gel member 30. Therefore, the force is less likely to be applied to the opposed portion 25. Furthermore, because the gel member 30 is in a gel state, the gel member 30 has adherence properties. The positioning rib 23 and the opposed portion 25 are bonded together with the gel member 30.

In the production process of the liquid crystal display device 10, components of the liquid crystal display device 10 are attached to one another in sequence starting from the component on the front side of the liquid crystal display device 10 (the upper side in FIG. 4), specifically as follows. The frame 13 is flipped over. The liquid crystal panel 11 is placed on the rear surface of the frame 13 while the liquid crystal panel 11 is positioned such that the inner surfaces of the positioning ribs 30 are parallel to and opposed to the respective opposed surfaces 25. The optical member 15 is positioned in the same manner as the liquid crystal panel 11 and placed on the rear surface of the liquid crystal panel 11. The gaps provided between the inner surfaces of the positioning ribs 23 and the respective opposed portions 25 of the liquid crystal panel 11 (and the optical member 15) are filled with the gel members 30. The light guide plate 16 is placed on the optical member 15 from the rear while the distal ends of the positioning ribs 23 are in contact with the light exit surface 16a of the light guide plate 16. The LED units LU are attached. The chassis 14 is attached. The screw members SM are tightened from the rear side of the chassis 14 so that the chassis 14 is fixed to the frame 13. The liquid crystal display device 10 is complete.

The configurations of the liquid crystal display device 10 of this embodiment include positioning portions (the positioning ribs 23 and the opposed portions 25) between the liquid crystal panel 11 and the frame 13. When conditions of the LEDs 17 are changed from high temperature conditions while turned on to low temperature conditions while turned off, the frame 13 contracts toward the liquid crystal panel 11. As a result, the frame 13 and the liquid crystal panel 11 are in contact with each other at the positioning ribs 23. Furthermore, a force is applied from the frame 13 side to the liquid crystal panel 11 side via the positioning ribs 23 due to the contraction of the frame 13. In FIG. 10, two-dot chain lines illustrate a position of the positioning rib 23 when the frame 13 contracted. Even if the force is applied from the frame 13 side to the liquid crystal panel 11 side due to the contraction of the frame 13, a portion of each gel member 30 to which the force is applied elastically deforms as illustrated with the two-dot chain lines in FIG. 10. As a result, the gel member 30 slightly sticks out in a direction perpendicular to the direction of the force. Namely, the force is absorbed. With this configuration, application of forces to the end surfaces of the liquid crystal panel 11 does not occur or is less likely to occur.

In the liquid crystal display device 10 of this embodiment, the gel members 30 are provided in the gaps between the positioning ribs 23 and the respective opposed portions 25. Even when the frame 13 contracts toward the liquid crystal panel 11, forces applied from the frame 13 side to the liquid crystal panel 11 side are absorbed by the gel members 30. Therefore, the application of forces to the liquid crystal panel 11 is restricted or suppressed. Appearance of white spots in some areas on the display surface 11c to which forces are applied due to application of forces toward the liquid crystal panel 11 does not occur or is less likely to occur.

In the liquid crystal display device 10 of this embodiment, the gel members 30 are in contact with the positioning ribs 23 and the opposed portions 25 of the liquid crystal panel 11 (and the optical member 15). With this configuration, the forces applied toward the liquid crystal panel 11 can be absorbed at the time when the frame 13 contracts toward the liquid crystal panel 11. Therefore, the application of forces to the liquid crystal panel 11 is effectively restricted or suppressed. The gel members 30 are in contact with the positioning ribs 23 and the opposed portions 25. With the gel members 30 that are in a gel state having adherence properties, the positioning ribs 23 and the respective opposed portions 25 are bonded together. Therefore, even if vibrations occur in the production process, the position of the liquid crystal panel 11 relative to the frame does not or less likely to change.

The liquid crystal display device 10 may include a larger number of pairs of the positioning ribs 30 and the opposed portions 25 such that the positioning ribs 30 and the opposed portions 25 are provided on opposed sides of the liquid crystal panel 11 and opposed side of the frame 13, respectively. With multiple gel members 30, forces applied from the frame 13 side toward the liquid crystal panel 11 side is effectively restricted or suppressed. Furthermore, the application of forces from the frame 13 side toward the liquid crystal panel 11 side is restricted or suppressed by equal force at the opposed sides. Therefore, the application of forces is effectively restricted or suppressed.

Second Embodiment

Figure 12:
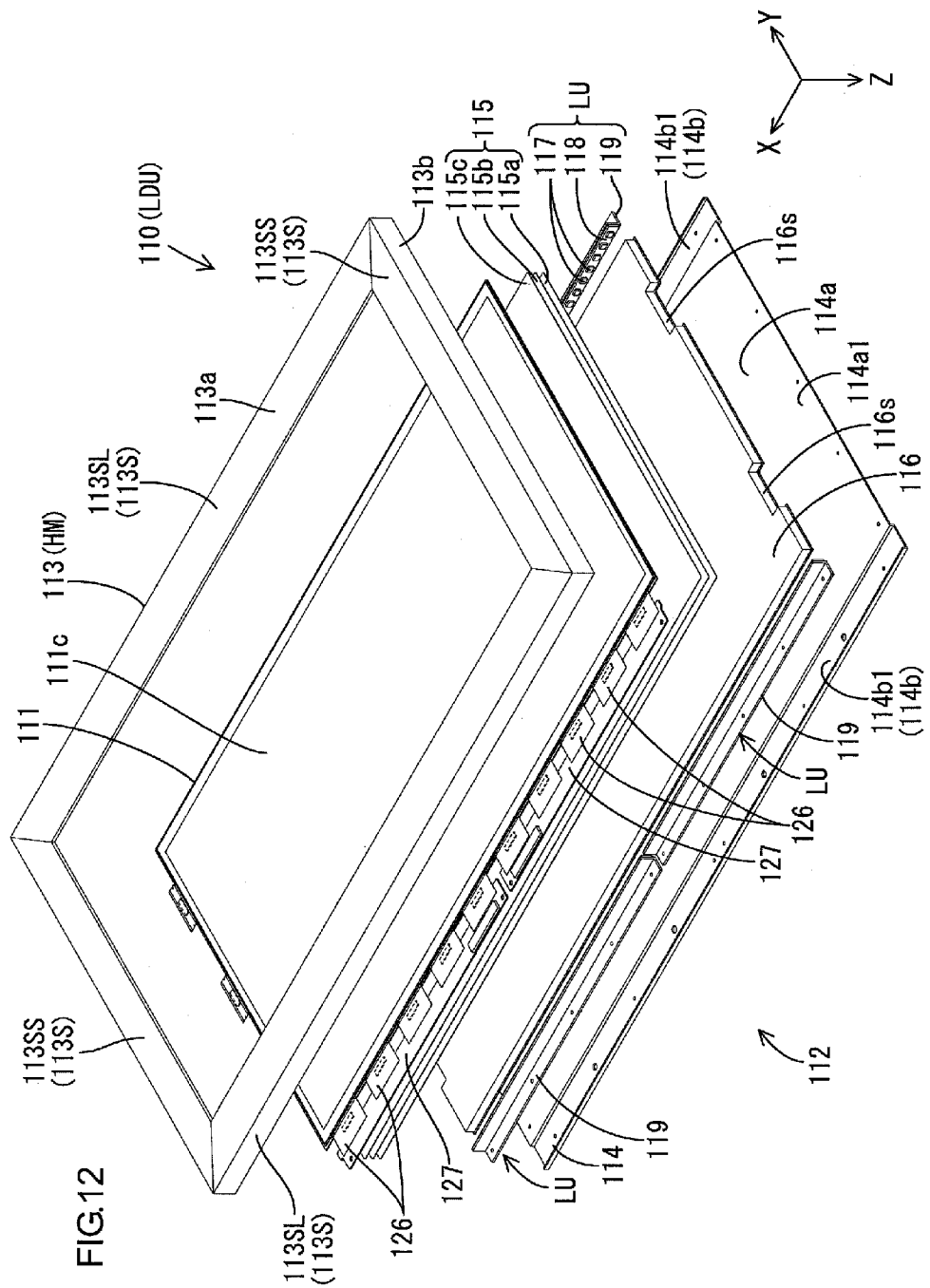
FIG. 12 is an exploded perspective view of a liquid crystal display device 110 illustrating a schematic configuration of a liquid crystal display unit LDU included therein according to a second embodiment.
Figure 13:
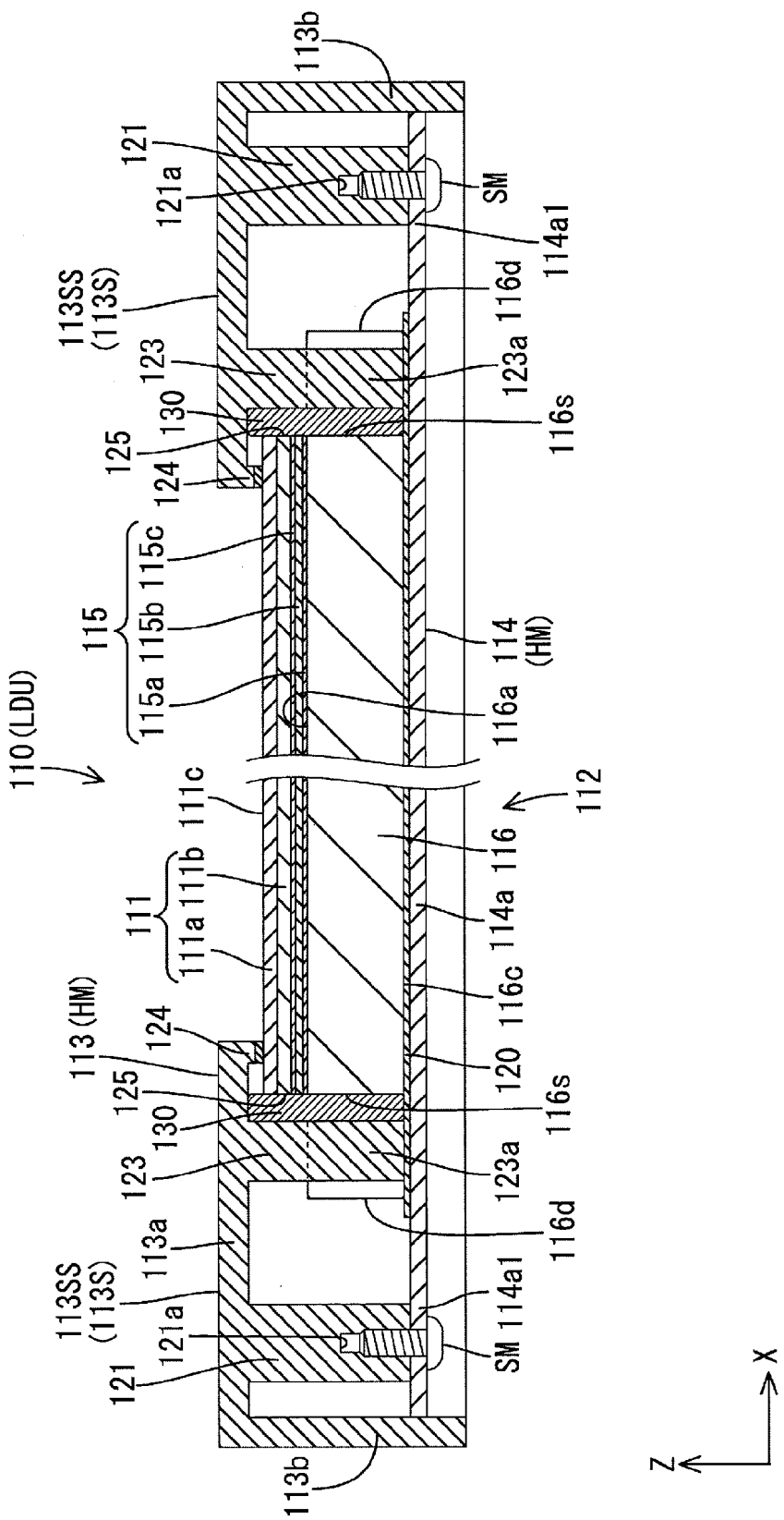
FIG. 13 is a cross-sectional view of the liquid crystal display device 110 along a long-side direction thereof with a section including a positioning rib 123 illustrating a cross-sectional configuration.

A second embodiment will be described with reference to the drawings. The second embodiment includes positioning ribs 123 and a light guide plate 116 having different configurations from the first embodiment. Other configurations are the same as the first embodiment. Similar configurations, operations, and effects to the first embodiment will not be described. In FIGS. 12 and 13, portions indicated by numerals including the reference numerals in FIGS. 3 and 6 with 100 added thereto have the same configurations as the portions indicated by the respective reference numerals in the first embodiment.

As illustrated in FIG. 13, a liquid crystal display device 110 according to the second embodiment includes the positioning ribs 123 that project from a from 113 side toward a chassis 114 and contact a bottom plate portion 114a of the chassis 114. The light guide plate 116 includes peripheral surfaces 116d, 116d on short sides. The light guide plate 116 includes cutouts 116s in portions overlapping the positioning ribs 123 in a plan view. Each cutout 116s is cut through the light guide plate 116 in the thickness direction of the light guide plate 116 (the Z-axis direction). The cutout 116s has a rectangular U shape in a plan view with an open end on the outer side (see FIGS. 12 and 13). The cutout 116a is recessed perpendicular to the peripheral surface of the light guide plate 116. Distal ends of the positioning ribs 123 are inserted in the respective cutouts 116s, that is, the positioning ribs 123 are fitted in the respective cutouts 116s (portions of the positioning ribs 123 in the cutouts 116s are hereinafter referred to as inserted portions 123a). With the configuration in which the positioning ribs 130 are fitted in the cutouts 116s of the light guide plate 116, the light guide plate 116 are positioned with respect to a plate surface thereof (the X-Y plane) between the frame 113 and a chassis 114.

Figure 14:
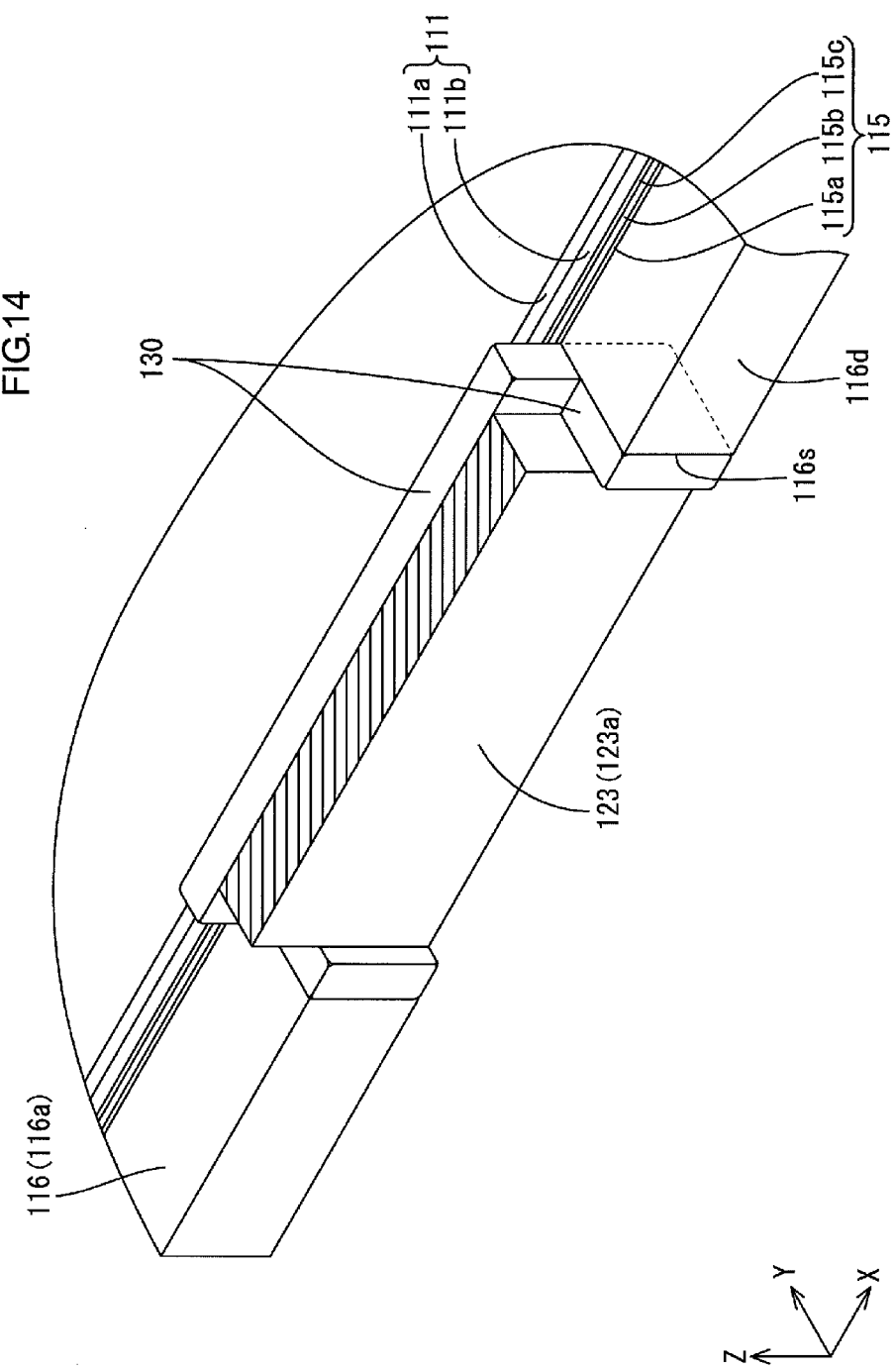
FIG. 14 is a magnified perspective view of a portion of a light guide plate 116 including a cutout 116s and therearound viewed at an angle from the rear.

Similar to the first embodiment, gaps between the positioning ribs 123 and opposed portions 125 of a liquid crystal panel 111 (and an optical member 115) are filled with gel members 130 (see FIG. 14). In this embodiment, gaps between the inserted portions 123a of the positioning ribs 123 and the respective cutouts 116s of the light guide plate 116 are filled with the gel members 130 (see FIG. 14). In this embodiment, the gel members 130 are made of material having light-blocking properties. Therefore, rays of light leaking from the cutouts 116s are blocked by the gel members 130. With this configuration, the rays of light do not or are less likely to enter the liquid crystal panel 111 through end surfaces thereof.

In a production process of the liquid crystal display device 110, as described for the first embodiment, components of the liquid crystal display device 110 are attached to one another in sequence starting from the component on the front side of the liquid crystal display device 110 (the upper side in FIG. 12). Specifically, steps similar to the first embodiment are performed. The liquid crystal panel 111 and the optical member 115 are placed on the rear side of the frame 113. The gel members 130 are placed in the positioning ribs 123 and the respective opposed portions 125. The light guide plate 116 is fitted in the frame 113 while the inserted portions 123a of the positioning ribs 123 are fitted in the respective cutouts 116s of the light guide plate 116. The gel members 130 are placed in the gap between the positioning ribs 123 and the respective cutouts 116s. The chassis 14 is mounted. The liquid crystal display device 110 is complete.

Because of demands in recent years for a reduction in production cost and a further reduction in thickness, an elimination of synthetic resin cabinets, which are external components of liquid crystal display units, has been considered. The liquid crystal display device 110 according to this embodiment is one of such a type, that is, the liquid crystal display device 110 does not include cabinets. In the liquid crystal display device 110 of such a type, rays of light leaking from the cutouts 116s of the light guide plate 116 may enter the liquid crystal display panel 111 through the peripheral surfaces thereof. In this case, some portion on the display surface 11c of the liquid crystal panel 111 may look excessively bright (bright spots). In the liquid crystal display device 110 according to this embodiment, the rays of light leaking from the cutouts 116s of the light guide plate 116 are restricted or suppressed from entering the liquid crystal panel 11 through the peripheral surfaces. Therefore, the bright spots are less likely to appear on the display surface 11 of the liquid crystal panel 111.

Third Embodiment

Figure 15:
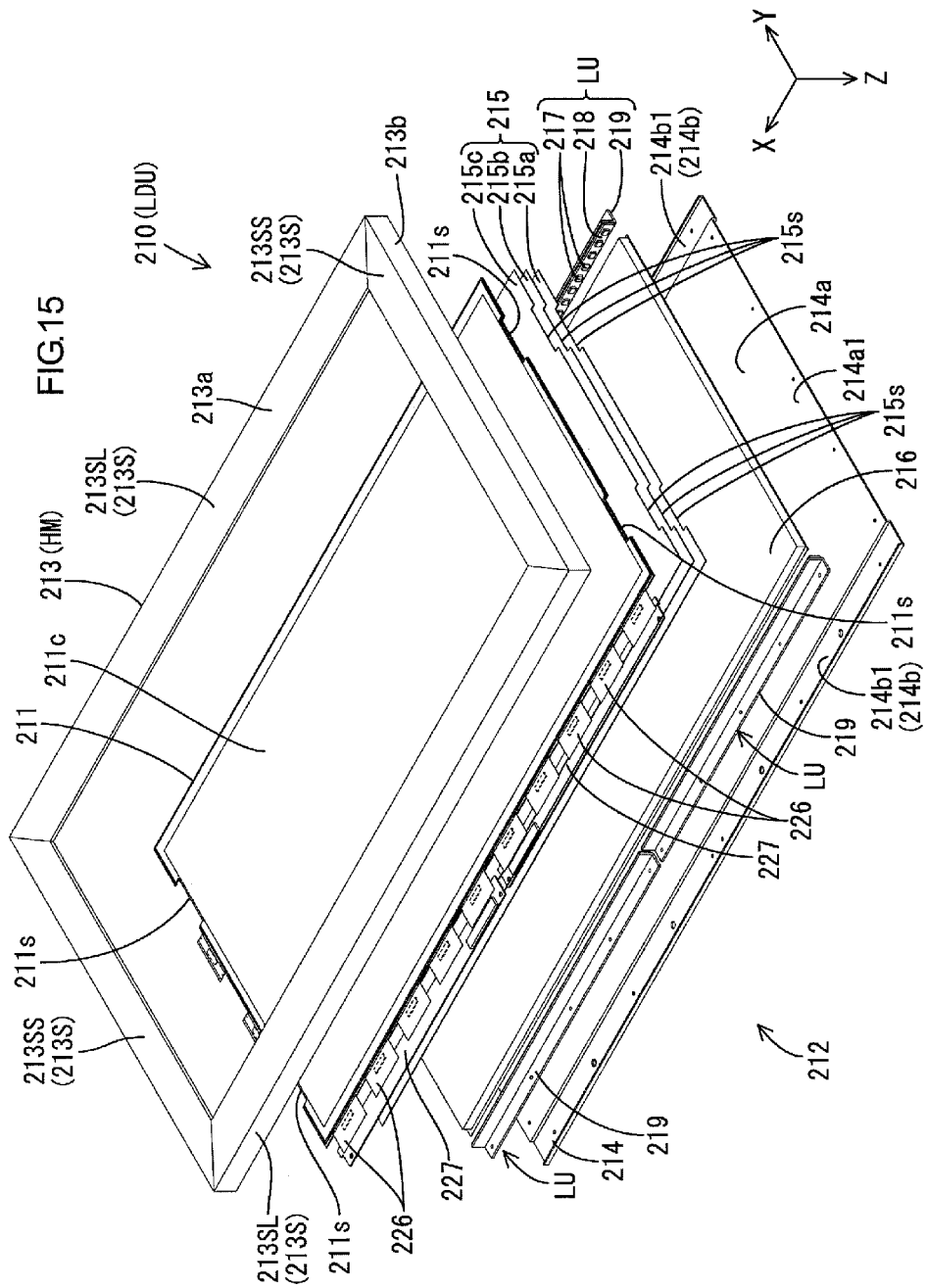
FIG. 15 is an exploded perspective view of a liquid crystal display device 210 illustrating a schematic configuration of a liquid crystal display unit LDU included therein according to a third embodiment.
Figure 16:
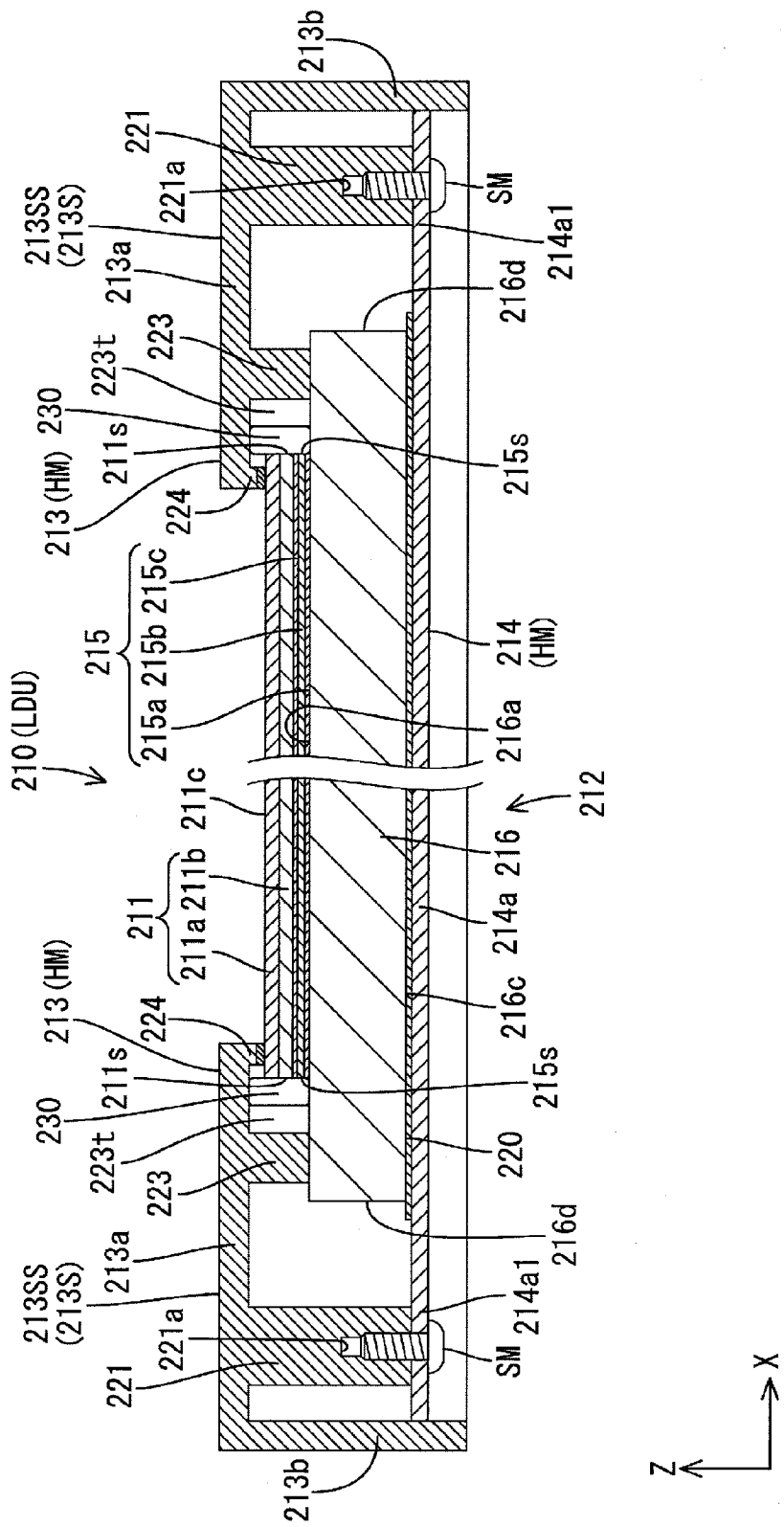
FIG. 16 is a cross-sectional of the liquid crystal display device 210 along a long-side direction thereof.
Figure 17:
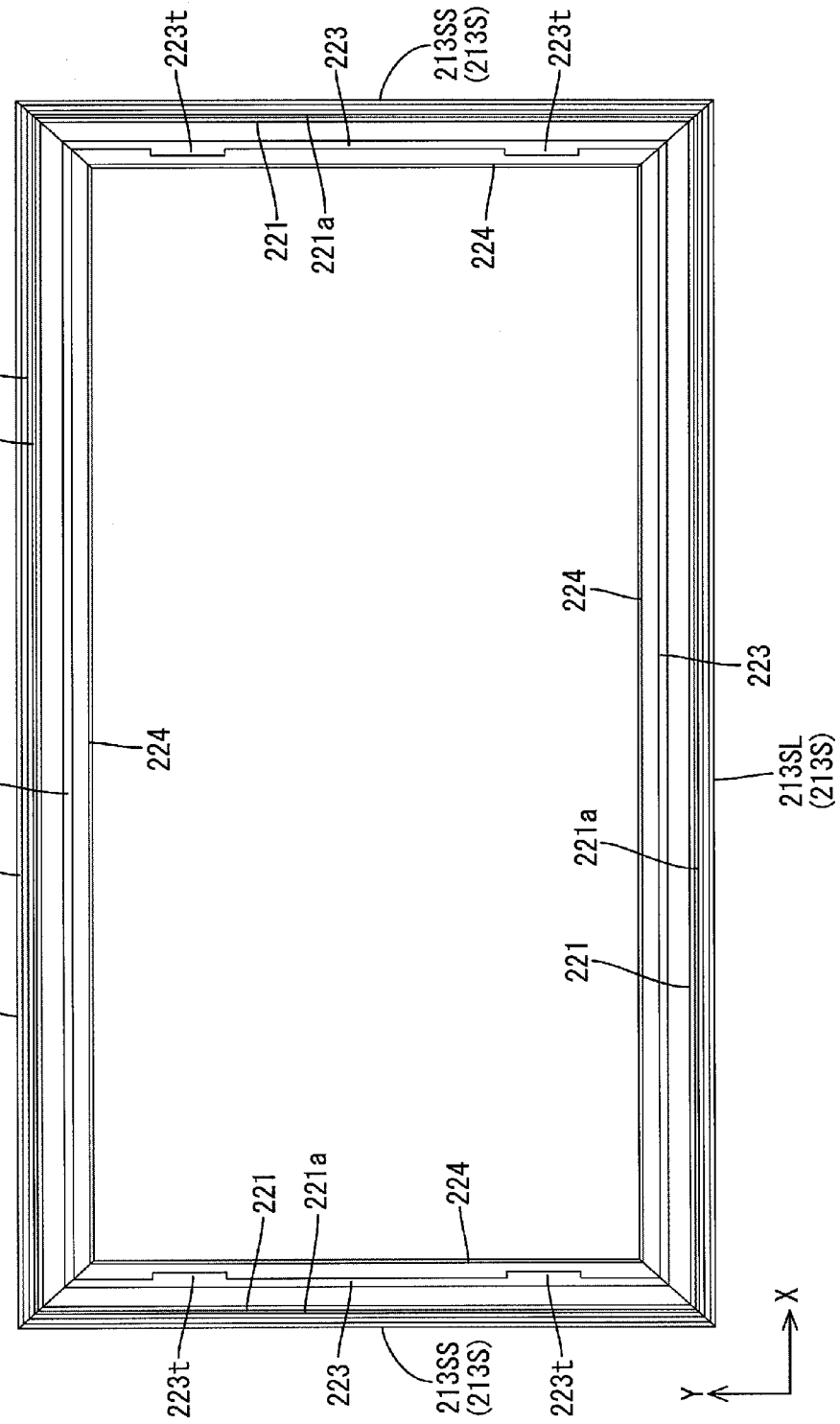
FIG. 17 is a plan view of a frame 213 viewed from the rear.

A third embodiment will be described with reference to the drawings. The third embodiment includes positioning ribs 223 and portions of a liquid crystal display panel 211 and an optical member 215 opposite the positioning ribs 223 having different configurations from the first embodiment. Other configurations are the same as the first embodiment. Similar configurations, operations, and effects to the first embodiment will not be described. In FIGS. 15, 16 and 17, portions indicated by numerals including the reference numerals in FIGS. 3, 5 and 7 with 200 added thereto have the same configurations as the portions indicated by the respective reference numerals in the first embodiment.

In the liquid crystal display device 210 according to the third embodiment, as illustrated in FIG. 17, each positioning rib 223 has an elongated block-like shape that extends along a corresponding panel holddown portion 213a. The panel holddown portions 213a include the positioning ribs 223, respectively. Each positioning rib 223 has a length equal to a length of the corresponding panel holddown portion 213a. Namely, the positioning ribs 223 together take a frame-like shape and edge areas of the light guide plate 216 are held down with the frame-like shaped positioning ribs 223 for an entire periphery thereof. The positioning ribs 223 take such a shape. The positioning ribs 223 of the panel holddown portions 213a of the short-side frame members 213SS include a total of four positioning protrusions (an example of protrusions) 223t. Each protrusion protrudes inwardly (toward the middle of the frame 213). The positioning protrusions 223t are located at positions corresponding to the positions of the positioning ribs 223 of the first embodiment, respectively. Namely, each short-side frame member 213SS includes a pair of the positioning protrusions 223t.

As illustrated in FIGS. 15 and 16, the liquid crystal panel 211 and the optical member 215 opposite the respective positioning protrusions 223t include positioning recesses (an example of a recess) 211s, 215s, respectively. The positioning recesses 211a, 215s open toward the respective positioning protrusions 223t so that the positioning protrusions 223t can be fitted in the positioning recesses 211s, 215s. The positioning protrusions 223t are fitted in the positioning recesses 211s, 215s. With this configuration, the liquid crystal panel 211 and the optical member 215 are held by the frame 213. Gaps between the positioning protrusions 223t and the respective recesses 211s, 215s are filled with gel members 230, respectively. Therefore, similar to the first embodiment, even if the frame 213 thermally contracts, the forces applied from the frame 213 side to the liquid crystal panel 211 (and the optical member 215) via the positioning protrusions 223t and the positioning recesses 211s are absorbed by the gel members 230. As described earlier, in this embodiment, the liquid crystal panel 211 (and the optical member 215) and the frame 213 are fixed together through fitting of protrusions in recesses. With this configuration, the liquid crystal panel 211 is positioned with respect to the panel surface direction thereof (the X-Y plane), that is, the positioning of the liquid crystal panel 211 within the frame 213 can be further effectively performed.

Fourth Embodiment

Figure 18:
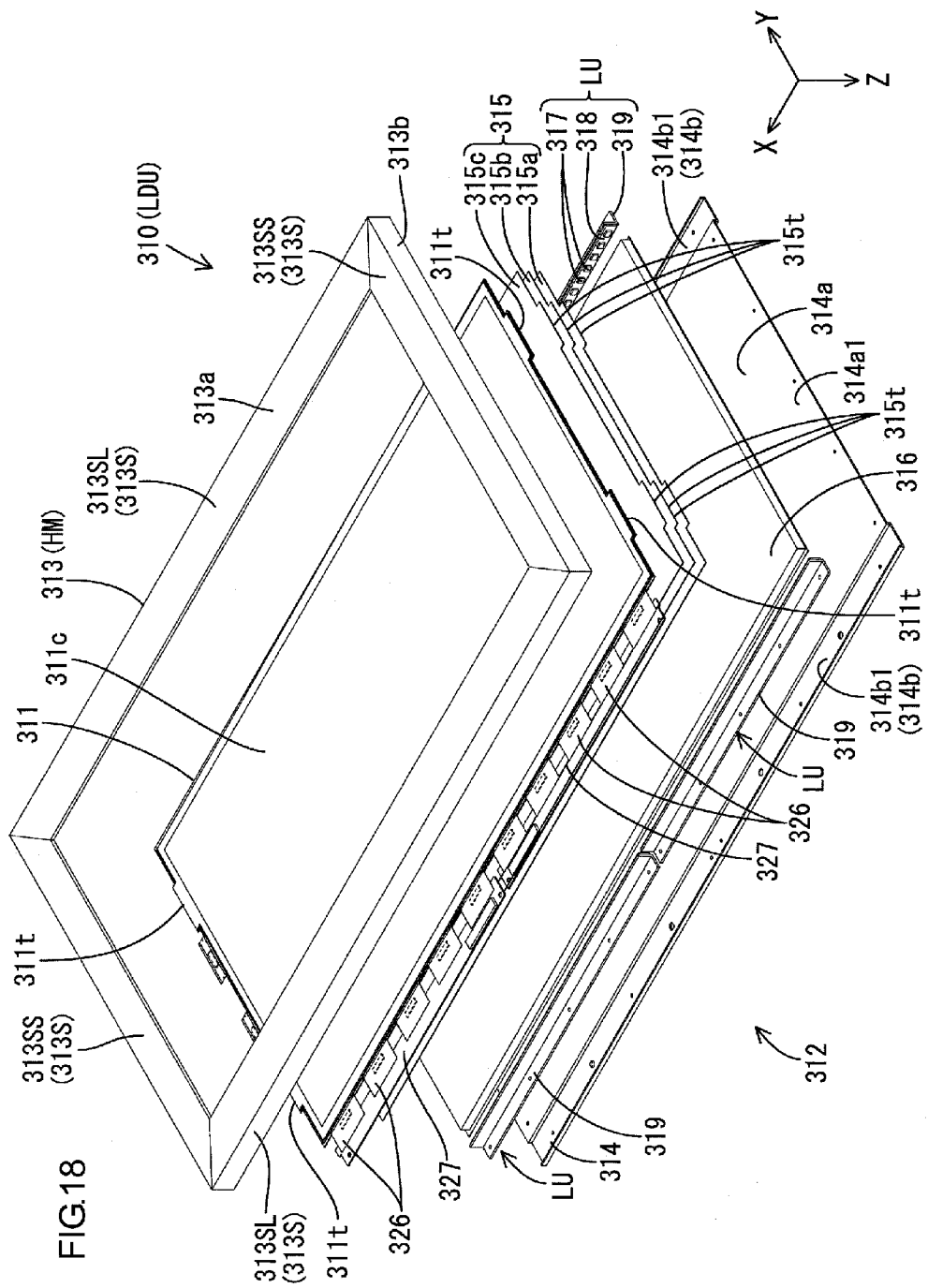
FIG. 18 is an exploded perspective view of a liquid crystal display device 310 illustrating a schematic configuration of a liquid crystal display unit LDU including therein according to a fourth embodiment.
Figure 19:
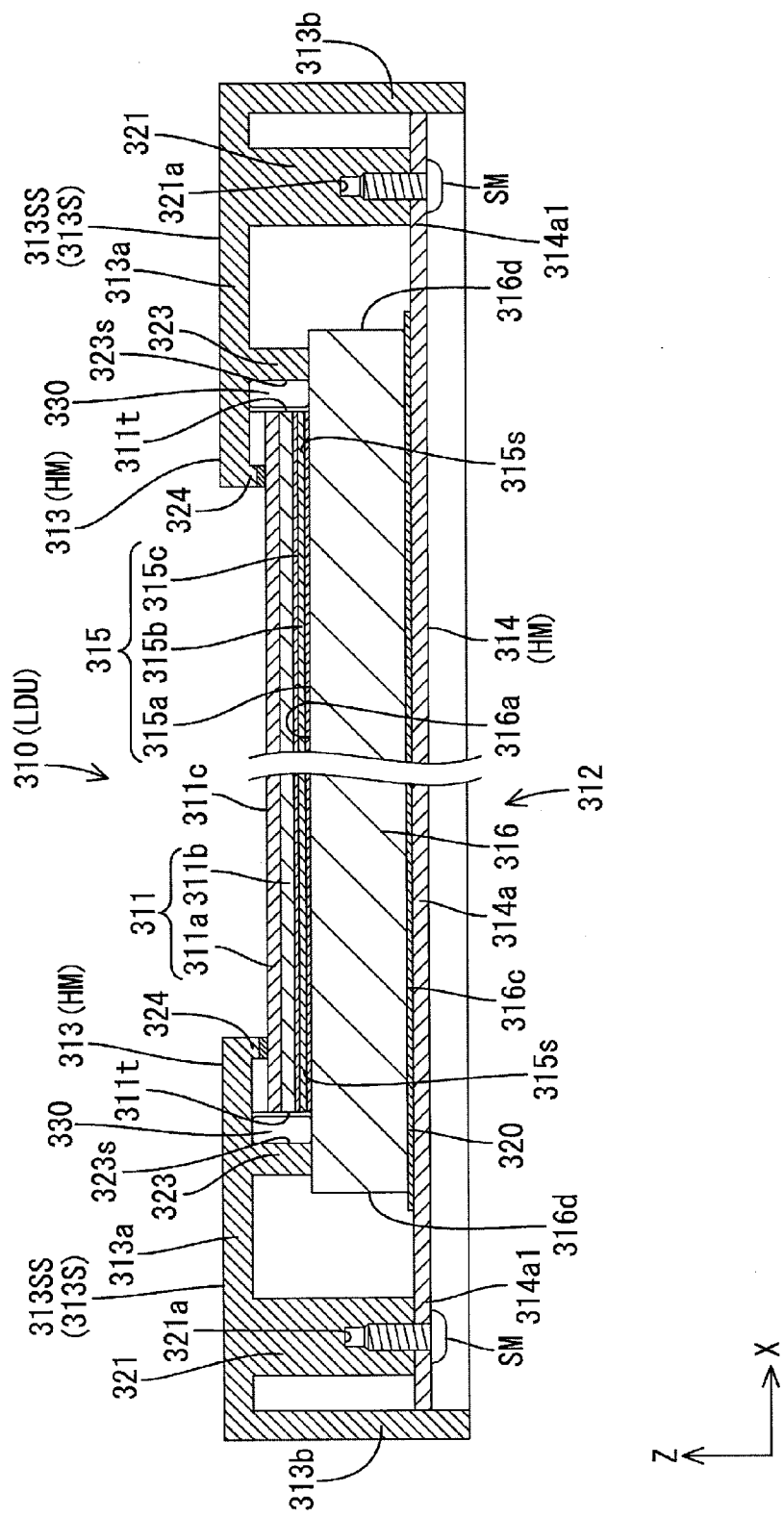
FIG. 19 is a cross-sectional view of the liquid crystal display device 310 along a long-side direction thereof with a section including a positioning rib 323 illustrating a cross-sectional configuration.
Figure 20:
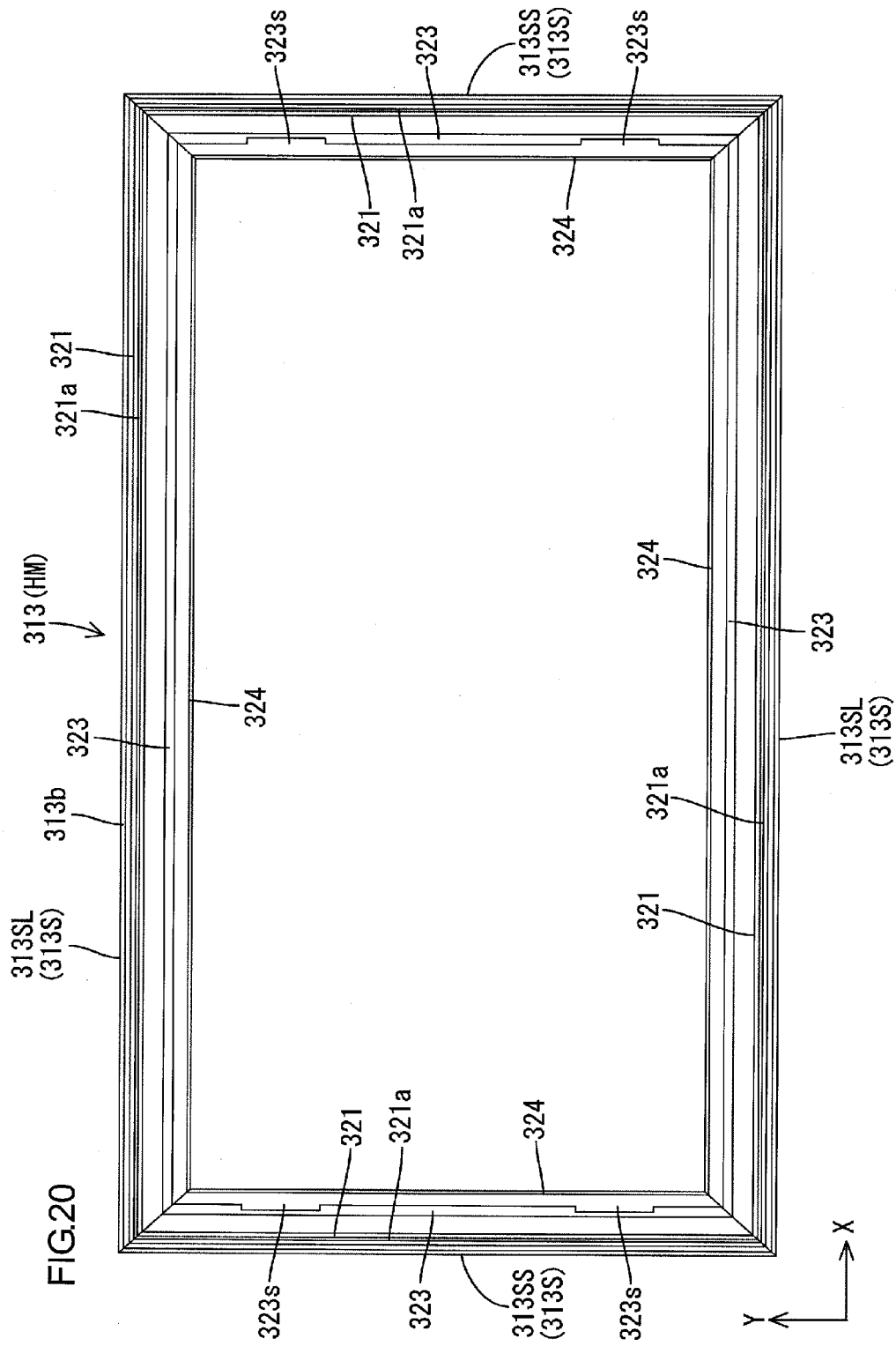
FIG. 20 is a plan view of a frame 313 viewed from the rear.

A fourth embodiment will be described with reference to the drawings. The fourth embodiment includes protrusions and recesses have opposite configurations to the third embodiment. Other configurations are the same as the third embodiment. Similar configurations, operations, and effects to the first embodiment will not be described. In FIGS. 18, 19 and 20, portions indicated by numerals including the reference numerals in FIGS. 15, 16 and 17 with 100 added thereto have the same configurations as the portions indicated by the respective reference numerals in the first embodiment or the third embodiment.

A liquid crystal display device 310 according to the fourth embodiment includes positioning recesses 323s and the positioning protrusions 311t, 315t. The positioning recesses 323s are located at positions corresponding to the positions of the positioning protrusions 223t in the third embodiment. The positioning protrusion 311t, 315t are located at positions corresponding to the positions of the positioning recesses 211s, 215s in the third embodiment. Namely, as illustrated in FIG. 20, similar to the configurations of the third embodiment, positioning ribs 323 extend along edged of panel holddown members 313a, respectively. The positioning ribs include a total of four positioning recesses 323s. As illustrated in FIGS. 18 and 19, the positioning protrusions 311t, 315t are located in portions of a liquid crystal panel 311 and an optical member 314 opposite the positioning recesses 323s. Gaps between the positioning recesses 323s and the positioning protrusions 311t, 315t are filled with gel members 330. With this configuration, similar to the third embodiment, forces applied from the frame 313 side to the liquid crystal panel 311 (and the optical member 315) when the frame 313 thermally contracts are absorbed by the gel members 330. The liquid crystal panel 311 (and the optical member 315) and the frame 313 are fixed together through fitting of protrusions in recesses. With this configuration, the liquid crystal panel 311 is positioned with respect to the panel surface direction thereof (the X-Y plane), that is, the positioning of the liquid crystal panel 311 within the frame 313 can be further effectively performed.

Modifications of the above embodiments will be listed below.

(1) In the above embodiments, elastic members are in a gel state. Elastic members other than in the gel state may be used. Even in this case, forces applied to the liquid crystal panel when the frame contracts are absorbed by the elastic members. Therefore, the appearance of white spots in some areas on the display surface to which forces are applied due to application of forces toward the liquid crystal panel does not occur or is less likely to occur.

(2) In the above embodiments, the liquid crystal display device includes the edge-light type backlight. However, the liquid crystal display device may include a direct type backlight unit.

(3) In the above embodiments, the liquid crystal display device does not include a cabinet. However, the liquid crystal display device may include a cabinet.

(4) In the above embodiments, the gel members are made of styrene. The gel members or the elastic members may be made of material other than styrene.

(5) The configurations, the shapes, and the arrangements of the positioning ribs can be modified as appropriate.

(6) The configurations, the shapes, and the arrangements of the gel members can be modified as appropriate.

(7) In the above embodiments, the liquid crystal display device including the liquid crystal panel as the display panel is used. However, the aspect of this invention can be applied to display devices including other types of display panels.

The above embodiments described in detail are only examples and the scope of the claimed invention is not limited to the embodiments. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, LDU: liquid crystal display unit, PWB: power board, MB: main board, CTB: control board, CV: cover, ST: stand, LU: LED unit, 10, 110, 210, 310: liquid crystal display device, 11, 111, 211, 311: liquid crystal panel, 12, 112, 212, 312: backlight device, 13, 133, 213, 313: frame, 14, 114, 214, 314: chassis, 15, 115, 215, 315: optical member, 16, 116, 216, 316: light guide plate, 116s: cutout, 20, 120, 220, 320: reflection sheet, 23, 123, 223, 323: positioning rib, 25, 125: opposed portion, 30, 130, 230, 330: gel member.

The invention claimed is:

1. A display device comprising:
    a light source;
    a display panel configured to provide a display using light from the light source;
    a chassis arranged on an opposite side of the display panel from a display surface of the display panel;
    a frame arranged on a display surface side of the display panel and holding at least the display panel and the light source between the frame and the chassis;
    a first positioning portion projecting from the frame toward the chassis and including a peripheral surface opposite a peripheral surface of the display panel to position the display panel;
    a second positioning portion included in the display panel in a portion thereof opposite the first positioning portion;
    an elastic member in a gap between the first positioning portion and the second positioning portion; and
    a light guide plate arranged over an opposite surface of the display panel to the display surface, including a peripheral surface opposite the light source, configured to guide the light from the light source toward the display panel, and including a cutout that receives the first positioning portion in the peripheral surface, wherein
    the first positioning portion projects from the frame toward the chassis so as to face the peripheral surface of the light guide plate, and
    the first positioning portion is fitted in the cutout.

2. The display device according to claim 1, wherein the elastic member is in contact with the first positioning portion and the second positioning portion.

3. The display device according to claim 2, wherein the elastic member is in a gel state.

4. The display device according to claim 1, wherein
    the elastic member has a light blocking property, and
    the gap between the first positioning portion and the cutout is filled with the elastic member.

5. The display device according to claim 1, wherein
    the first positioning portion includes a protrusion that protrudes toward the display panel,
    the second positioning portion includes a recess that opens toward the protrusion such that the protrusion is fitted therein, and
    the elastic member is in the gap between the protrusion and the recess.

6. The display device according to claim 5, wherein
    the protrusion and the recess have rectangular shapes in a plan view, and
    the elastic member is at least in a gap between a distal end surface of the protrusion and a bottom surface of the recess.

7. The display device according to claim 1, further comprising multiple pairs of the first positioning portion and the second positioning portion.

8. The display device according to claim 7, wherein
    the multiple pairs of the first positioning portion and the second positioning portion are arranged at opposed sides of the display panel and opposed sides of the frame.

9. The display device according to claim 1, wherein the display panel is a liquid crystal display panel including liquid crystals.

10. A television device comprising the display device according to claim 1.

* * * * *